(12) United States Patent
Scimemi et al.

(10) Patent No.: US 12,401,695 B2
(45) Date of Patent: Aug. 26, 2025

(54) CYBERSECURITY PROTECTION AND RECOVERY CAPABILITY MEASUREMENT SYSTEM

(71) Applicant: The Government of the United States of America, as represented by the Secretary of Homeland Security, Washington, DC (US)

(72) Inventors: Antonino Enrico Scimemi, Idaho Falls, ID (US); Michael Gregory Magill, Washington, DC (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/906,462

(22) Filed: Oct. 4, 2024

(65) Prior Publication Data

US 2025/0119456 A1 Apr. 10, 2025

Related U.S. Application Data

(60) Provisional application No. 63/542,831, filed on Oct. 6, 2023.

(51) Int. Cl.
*H04L 29/06* (2006.01)
*H04L 9/40* (2022.01)
*H04L 41/06* (2022.01)

(52) U.S. Cl.
CPC ............. *H04L 63/20* (2013.01); *H04L 41/06* (2013.01)

(58) Field of Classification Search
CPC ..... H04L 63/10; H04L 63/20; H04L 63/1433; H04L 63/205; H04L 63/0263; H04L 63/0227
See application file for complete search history.

(56) References Cited

U.S. PATENT DOCUMENTS

| | | | |
|---|---|---|---|
| 2016/0012235 A1* | 1/2016 | Lee | G06F 21/6218 726/25 |
| 2022/0366332 A1* | 11/2022 | Duessel | G06Q 10/0635 |

OTHER PUBLICATIONS

A Safer Nation Through Collaboration and Innovation: 2022 Homeland Security Today Awards, Nov. 18, 2022, https://www.hstoday.us/featured/a-safer-nation-through-collaboration-and-innovation-2022-homeland-security-today-awards/.

* cited by examiner

*Primary Examiner* — Longbit Chai
(74) *Attorney, Agent, or Firm* — Kelly G. Hyndman; Robert W. Busby

(57) ABSTRACT

A system and method for analyzing the cybersecurity risk of a computer network. The system and method may feature a computer network analyzer configured to obtain information about the computer network, scoring logic for assessing the cybersecurity risk of the computer network, and a graphic module for displaying the evaluation results. The computer network analyzer may be configured to score the computer network based on the computer network's protection capabilities and recovery capabilities. The computer network analyzer may be configured to use item response theory to score, evaluate, and analyze the computer network's protection capabilities and recovery capabilities.

28 Claims, 11 Drawing Sheets

| Capability Function | Total Function Score | Cat ID | Subcategory ID | Capability Allocation | Subcategory ID Score (0-1) | Subcategory Weighting (1-20) | Total Subcategory ID Score | Total Function Score | Add To Protection Score | Add to Recovery Score |
|---|---|---|---|---|---|---|---|---|---|---|
| Protection | Protect function = Σ (Sub Cat. ID Score × Weighting) = 1410 | PR.AC | PR.AC-1 | Protection | 5 | 19 | 95 | | 95 | 0 |
| | | | PR.AC-2 | Protection | 4 | 20 | 80 | | 80 | 0 |
| | | | PR.AC-3 | Protection | 0 | 7 | 0 | | 0 | 0 |
| | | | PR.AC-4 | Protection | 0 | 14 | 0 | | 0 | 0 |
| | | | PR.AC-5 | Protection | 0 | 3 | 0 | | 0 | 0 |
| | | | PR.AC-6 | Protection | 3 | 19 | 57 | | 57 | 0 |
| | | | PR.AC-7 | Protection | 3 | 12 | 36 | | 36 | 0 |
| | | PR.AT | PR.AT-1 | Protection | 3 | 12 | 36 | | 36 | 0 |
| | | | PR.AT-2 | Protection | 0 | 17 | 0 | | 0 | 0 |
| | | | PR.AT-3 | Protection | 5 | 13 | 65 | | 65 | 0 |
| | | | PR.AT-4 | Protection | 0 | 18 | 0 | | 0 | 0 |
| | | | PR.AT-5 | Protection | 1 | 14 | 14 | | 14 | 0 |
| | | PR.DS | PR.DS-1 | Protection | 5 | 9 | 45 | | 45 | 0 |
| | | | PR.DS-2 | Protection | 5 | 15 | 75 | | 75 | 0 |
| | | | PR.DS-3 | Protection | 3 | 11 | 33 | | 33 | 0 |
| | | | PR.DS-4 | Protection | 5 | 3 | 15 | | 15 | 0 |
| | | | PR.DS-5 | Protection | 2 | 20 | 40 | | 40 | 0 |
| | | | PR.DS-6 | Protection | 4 | 20 | 80 | | 80 | 0 |
| | | | PR.DS-7 | Protection | 1 | 3 | 3 | | 3 | 0 |
| | | | PR.DS-8 | Protection | 5 | 10 | 50 | | 50 | 0 |
| | | PR.IP | PR.IP-1 | Protection | 4 | 11 | 44 | | 44 | 0 |
| | | | PR.IP-2 | Protection | 0 | 1 | 0 | | 0 | 0 |
| | | | PR.IP-3 | Protection | 4 | 20 | 80 | | 80 | 0 |
| | | | PR.IP-4 | Protection | 1 | 15 | 15 | | 15 | 0 |
| | | | PR.IP-5 | Protection | 1 | 16 | 16 | | 16 | 0 |
| | | | PR.IP-6 | Protection | 5 | 3 | 15 | | 15 | 0 |
| | | | PR.IP-7 | Protection | 1 | 18 | 18 | | 18 | 0 |
| | | | PR.IP-8 | Protection | 1 | 14 | 14 | | 14 | 0 |
| | | | PR.IP-9 | Protection | 3 | 16 | 48 | | 48 | 0 |
| | | | PR.IP-10 | Protection | 5 | 12 | 60 | 1321 | 60 | 0 |

Fig. 7A

| | A | B | C | D | E | F | G | H | I | J | K | L |
|---|---|---|---|---|---|---|---|---|---|---|---|---|
| 1 | Capability Function | | Total Function Score | Cat ID | Subcategory ID | Capability Allocation | Subcategory ID Score (0-5) | Subcategory Weighting (1-20) | Total Subcategory ID Score | Total Function Score | Add To Protection Score | Add to Recovery Score |
| 32 | | | | | PR.IP-11 | Protection | 0 | 5 | 0 | | 0 | 0 |
| 33 | | | | PR.MA | PR.IP-12 | Protection | 4 | 20 | 80 | | 80 | 0 |
| 34 | | | | | PR.MA-1 | Protection | 5 | 2 | 10 | | 10 | 0 |
| 35 | | | | | PR.MA-2 | Protection | 1 | 1 | 1 | | 1 | 0 |
| 36 | | | | | PR.PT-1 | Protection | 2 | 2 | 4 | | 4 | 0 |
| 37 | | | | PR.PT | PR.PT-2 | Protection | 1 | 2 | 2 | | 2 | 0 |
| 38 | | | | | PR.PT-3 | Protection | 5 | 16 | 80 | | 80 | 0 |
| 39 | | | | | PR.PT-4 | Protection | 5 | 14 | 70 | | 70 | 0 |
| 40 | | | | | PR.PT-5 | Protection | 5 | 8 | 40 | | 40 | 0 |
| 41 | | | | | ID.AM-1 | Recovery | 1 | 2 | 2 | | 0 | 2 |
| 42 | | | | | ID.AM-2 | Recovery | 3 | 17 | 51 | 305 | 0 | 51 |
| 43 | | | | ID.AM | ID.AM-3 | Recovery | 1 | 5 | 5 | | 0 | 5 |
| 44 | | | | | ID.AM-4 | Protection | 3 | 7 | 21 | | 21 | 0 |
| 45 | | | | | ID.AM-5 | Protection | 3 | 2 | 6 | | 6 | 0 |
| 46 | | | | | ID.AM-6 | Protection | 0 | 7 | 0 | | 0 | 0 |
| 47 | | | | | ID.BE-1 | Protection | 4 | 12 | 48 | | 48 | 0 |
| 48 | | | | ID.BE | ID.BE-2 | Protection | 2 | 20 | 40 | | 40 | 0 |
| 49 | | | | | ID.BE-3 | Protection | 0 | 9 | 0 | | 0 | 0 |
| 50 | | | | | ID.BE-4 | Recovery | 2 | 13 | 26 | | 0 | 26 |
| 51 | | | | | ID.BE-5 | Recovery | 1 | 11 | 11 | | 0 | 11 |
| 52 | IDENTIFY | | Identify Function (Protect portion) = Σ (Sub Cat. ID Score × Weighting) = 305 | | ID.GV-1 | Recovery | 4 | 5 | 20 | | 0 | 20 |

Fig. 7B

| Capability Function | Function | Total Function Score | Cat ID | Subcategory ID | Capability Allocation | Subcategory ID Score (0-5) | Subcategory Weighting (1-20) | Total Subcategory ID Score | Total Function Score | Add To Protection Score | Add to Recovery Score |
|---|---|---|---|---|---|---|---|---|---|---|---|
| | | Identify Function (Recovery portion) = Σ (Sub Cat. ID Score × Weighting) = 323 | ID.GV | ID.GV-2 | Recovery | 5 | 18 | 90 | 323 | 0 | 90 |
| | | | | ID.GV-3 | Recovery | 4 | 7 | 28 | | 0 | 28 |
| | | | | ID.GV-4 | Protection | 0 | 16 | 0 | | 0 | 0 |
| | | | ID.RA | ID.RA-1 | Protection | 4 | 1 | 4 | | 4 | 0 |
| | | | | ID.RA-2 | Recovery | 2 | 7 | 14 | | 0 | 14 |
| | | | | ID.RA-3 | Recovery | 0 | 10 | 0 | | 0 | 0 |
| | | | | ID.RA-4 | Recovery | 4 | 19 | 76 | | 0 | 76 |
| | | | | ID.RA-5 | Recovery | 0 | 19 | 0 | | 0 | 0 |
| | | | | ID.RA-6 | Protection | 2 | 6 | 12 | | 12 | 0 |
| | | | ID.RM | ID.RM-1 | Protection | 0 | 16 | 0 | | 0 | 0 |
| | | | | ID.RM-2 | Protection | 4 | 7 | 28 | | 28 | 0 |
| | | | | ID.RM-3 | Protection | 0 | 7 | 0 | | 0 | 0 |
| | | | ID.SC | ID.SC-1 | Protection | 4 | 2 | 8 | | 8 | 0 |
| | | | | ID.SC-2 | Protection | 3 | 16 | 48 | | 48 | 0 |
| | | | | ID.SC-3 | Protection | 5 | 14 | 70 | | 70 | 0 |
| | | | | ID.SC-4 | Protection | 4 | 5 | 20 | | 20 | 0 |
| | | | | ID.SC-5 | Recovery | 0 | 20 | 0 | | 0 | 0 |
| Recovery | DETECT | Detect Function = Σ (Sub Cat. ID Score × Weighting) = 656 | DE.AE | DE.AE-1 | Recovery | 3 | 6 | 18 | 656 | 0 | 18 |
| | | | | DE.AE-2 | Recovery | 4 | 3 | 12 | | 0 | 12 |
| | | | | DE.AE-3 | Recovery | 5 | 16 | 80 | | 0 | 80 |
| | | | | DE.AE-4 | Recovery | 4 | 5 | 20 | | 0 | 20 |
| | | | | DE.AE-5 | Recovery | 2 | 19 | 38 | | 0 | 38 |
| | | | DE.CM | DE.CM-1 | Recovery | 3 | 17 | 51 | | 0 | 51 |
| | | | | DE.CM-2 | Recovery | 1 | 15 | 15 | | 0 | 15 |
| | | | | DE.CM-3 | Recovery | 3 | 9 | 27 | | 0 | 27 |
| | | | | DE.CM-4 | Recovery | 3 | 11 | 33 | | 0 | 33 |
| | | | | DE.CM-5 | Recovery | 2 | 17 | 34 | | 0 | 34 |
| | | | | DE.CM-6 | Recovery | 4 | 20 | 80 | | 0 | 80 |
| | | | | DE.CM-7 | Recovery | 5 | 17 | 85 | | 0 | 85 |

Fig. 7C

| Capability Function | Capability Function | Total Function Score | Cat ID | Subcategory ID | Capability Allocation | Subcategory ID Score (0-5) | Subcategory Weighting (1-20) | Total Subcategory ID Score | Total Function Score | Add To Protection Score | Add to Recovery Score |
|---|---|---|---|---|---|---|---|---|---|---|---|
| | | | | DE-CM-8 | Recovery | 5 | 16 | 80 | | 0 | 80 |
| | | | DE.DP | DE.DP-1 | Recovery | 0 | 5 | 0 | | 0 | 0 |
| | | | | DE.DP-2 | Recovery | 2 | 7 | 14 | | 0 | 14 |
| | | | | DE.DP-3 | Recovery | 3 | 13 | 39 | | 0 | 39 |
| | | | | DE.DP-4 | Recovery | 2 | 15 | 30 | | 0 | 30 |
| | | | | DE.DP-5 | Recovery | 0 | 9 | 0 | | 0 | 0 |
| | | | RS.RP | RS.RP-1 | Recovery | 5 | 12 | 60 | | 0 | 60 |
| | RESPOND | Respond Function = Σ (SubCat.ID Score × Weighting) = 478 | RS.CO | RS.CO-1 | Recovery | 3 | 13 | 39 | 478 | 0 | 39 |
| | | | | RS.CO-2 | Recovery | 1 | 20 | 20 | | 0 | 20 |
| | | | | RS.CO-3 | Recovery | 5 | 10 | 50 | | 0 | 50 |
| | | | | RS.CO-4 | Recovery | 5 | 10 | 50 | | 0 | 50 |
| | | | | RS.CO-5 | Recovery | 3 | 4 | 12 | | 0 | 12 |
| | | | RS.AN | RS.AN-1 | Recovery | 4 | 12 | 48 | | 0 | 48 |
| | | | | RS.AN-2 | Recovery | 0 | 5 | 0 | | 0 | 0 |
| | | | | RS.AN-3 | Recovery | 3 | 1 | 3 | | 0 | 3 |
| | | | | RS.AN-4 | Recovery | 2 | 15 | 30 | | 0 | 30 |
| | | | | RS.AN-5 | Recovery | 5 | 16 | 80 | | 0 | 80 |
| | | | RS.MI | RS.MI-1 | Recovery | 2 | 18 | 36 | | 0 | 36 |
| | | | | RS.MI-2 | Recovery | 0 | 9 | 0 | | 0 | 0 |
| | | | | RS.MI-3 | Recovery | 2 | 3 | 6 | | 0 | 6 |
| | | | RS.IM | RS.IM-1 | Recovery | 4 | 11 | 44 | | 0 | 44 |
| | | | | RS.IM-2 | Recovery | 0 | 11 | 0 | | 0 | 0 |

Fig. 7D

| | A | B | C | D | E | F | G | H | I | J | K | L |
|---|---|---|---|---|---|---|---|---|---|---|---|---|
| 1 | Capability Function | | Total Function Score | Cat ID | Subcate- gory ID | Capability Allocation | Subcat- egory ID Score (0-i) | Subcategory Weighting (1-20) | Total Subcategory ID Score | Total Function Score | Add To Protection Score | Add to Recovery Score |
| 105 | | RECOVER | Function = Σ (Sub Cat. ID Score × Weighting) = 87 | RC.IM | RC.IM-1 | Recovery | 0 | 14 | 0 | 87 | 0 | 0 |
| 106 | | | | | RC.IM-2 | Recovery | 2 | 7 | 14 | | 0 | 14 |
| 107 | | | | RC.CO | RC.CO-1 | Recovery | 5 | 5 | 25 | | 0 | 25 |
| 108 | | | | | RC.CO-2 | Recovery | 0 | 10 | 0 | | 0 | 0 |
| 109 | | | | | RC.CO-3 | Recovery | 0 | 14 | 0 | | 0 | 0 |
| 110 | Protection Score = | 1626 | Recovery Score = | 1544 | | | | Total Score = (1626, 1544) (Protection, Recovery) | | | Max Scores (3005, 3045) |

Fig. 7E

CYBERSECURITY PROTECTION AND RECOVERY CAPABILITY MEASUREMENT SYSTEM

CROSS-REFERENCES

This application claims the benefit of priority to U.S. Provisional Patent Application No. 63/542,831 filed Oct. 6, 2023.

STATEMENT OF GOVERNMENT INTEREST

The present invention was made by employees of the United States Department of Homeland Security in the performance of their official duties.

FIELD

The discussion below generally relates to a system and method for measuring and quantifying a computer systems' protection and recovery capabilities.

BACKGROUND

NIST (the National Institute for Standards and Technology) built a framework known as the Cybersecurity Framework (CSF). The CSF contains five functions: Identify, Protect, Detect, Respond, and Recover. The five functions play a role in a successful and holistic cybersecurity program. They aid organizations in expressing their management of cybersecurity risk at a high level and enabling risk management decisions.

The Identify Function helps develop a system architecture organization. Identification is involved in managing cybersecurity risks to systems, people, assets, data, and capabilities. Identifying may include identifying vulnerabilities and supply chain weaknesses.

The Protection Function (also known as or called the Protect Function) sets guidelines for appropriate safeguards on the computer network. The Protection Function outlines how to limit or contain damage that can be caused by a cybersecurity breach or event. Protection could relate to physical protective measures like firewalls, but also to empowering staff through training.

The Detection Function (also known as or called the Detect Function) defines how the computer network and operator detect activities going on in the computer network. In many cases, rapid detection of a cybersecurity threat helps minimize its impact. Detection functions may include processes like monitoring ports, web traffic, and cameras.

The Respond Function sets forth activities the computer network and/or its operators should take in response to a cybersecurity breach or event. The respond function may include how a computer network might respond to a data breach, what sort of forensic analysis process the computer network will follow to identify causes of a breach, what kind of mitigation activities the computer network may execute to reduce the impact of the breach, etc.

The Recovery Function includes recovery plans for a computer network to restore lost services or data in response a cybersecurity incident, breach, or event. The Recovery Function relates to how a computer network reverts from a compromised state to normal operations.

SUMMARY

A system and method for analyzing a cybersecurity posture of computer network. The system and method may feature a computer network analyzer configured to obtain information about the computer network, scoring logic for assessing performance of the computer network, and a graphic module for displaying the score. The computer network analyzer may be configured to score the computer network based on the computer networks protection capabilities and recover capabilities. The system and method may also comprise a data modeler configured to optimize return on investment (ROI) associated with implementing a change in one or more controls of a computer network's cybersecurity posture.

BRIEF DESCRIPTION OF DRAWINGS

FIG. 7A-E shown a table of scores generated by a table generator.

DETAILED DESCRIPTIONS OF DRAWINGS

Systems and methods related to evaluating and reducing the cybersecurity risk of a computer network, system, or organization through activities including, but not limited to, implementation of cybersecurity policies. A cybersecurity policy is a collection of controls, processes, security, logs, records, methods, and/or systems for a given computer network to facilitate protection and recovery of data. A computer network may include one, two or more computers connected with a network. For example, one server connected to a firewall and switch, a router, two laptops, and tablet might form a computer network.

A computer network cybersecurity policy may comprise various protection and recovery controls/measures designed to safeguard the computer network. A computer network's cybersecurity posture may be a reflection of how many protection and recovery controls the computer network has implemented. Generally, the greater number of cybersecurity controls and/or measures a computer network has implemented the higher or better its cybersecurity posture. The risk of data breach, risk of loss of data recovery, etc. is generally inversely related to the score of the computer network's cybersecurity posture. So, a system administrator or feedback loop designed to implement requested changes can improve a computer network's cybersecurity posture by implementing (recommended) controls in a cybersecurity policy thereby lowering the cybersecurity risk of data loss or data breach.

Figure 1:
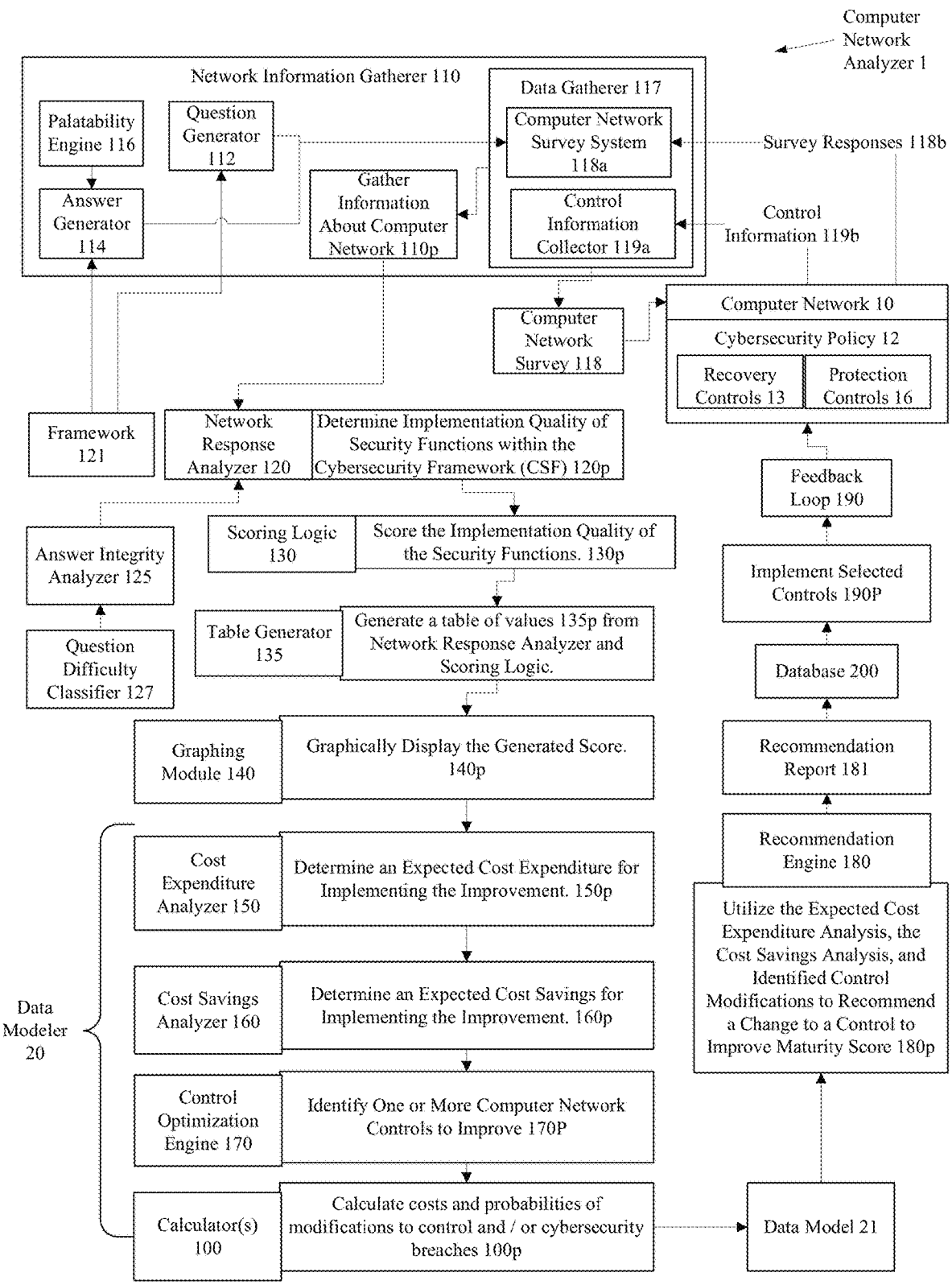
FIG. 1 is a schematic drawing of the computer network analyzer.

FIG. 1 shows a computer network analyzer (CNA) 1 comprising: an information gatherer 110 configured to gather 110$p$ information about a computer network 10; a network response analyzer 120 configured to assess implementation quality of security functions within the cybersecurity framework (CSF) 120$p$; and scoring logic 130 configured to score the implementation quality of the security functions 130$p$. The CNA may assess control implementation quality through evaluation of third-party control assessment results, technical evaluation, or through survey based attestation. The computer network analyzer 1 may also comprise a graphing module 140 configured to graphically display a generated score 140$p$ from the scoring logic; and a data modeler 20 optionally configured to model costs, savings, and probabilities associated with implementing or not implementing a change to a computer network controls or security. The data modeler 20 may comprise a cost expenditure analyzer 150 for determining an expected cost expenditure for implementing a control improvement 150p and a cost savings analyzer 160 configured to determine an expected cost savings for implementing the improvement 160p. The data modeler 20 may comprise a control optimization engine configured to identify one or more computer network controls to improve. The control optimization engine 170 may select a modification to the one or more computer network controls that, when implemented, will raise the score of the computer network's cybersecurity posture as calculated by scoring logic. The raise in score may be a maturity level integer. The control optimization engine 170 may also be configured to determine controls and/or categories to improve that are calculated to generate a positive expected return on investment in a preset time period 170p.

The CNA 1 may comprise a recommendation engine 180 configured to utilize the expected cost expenditure analysis, the cost savings analysis, and identified control modifications to generate a recommendation report 181 comprising changes or modifications to a control to a computer network's cybersecurity framework that will improve 180p the maturity score of the computer network. The CNA 1 may comprise a feedback loop 190 configured to implement selected/recommended modification or changes to controls 190p to the computer network 10. The computer network may be configured to make hardware and/or software changes to its control implementations or configurations upon receiving the recommendation report. The feedback loop 190 may present instructions to the computer network and/or operator of the computer network to cause the computer network to implement modifications recommended in the recommendation report 181.

A cybersecurity framework generally provides policies and controls which, when implemented, help protect a computer network. There are several published cybersecurity frameworks such as COBIT (Control Objectives for Information Technologies), ISO/IEC 27001 (Industry Standards Organization/International Electrotechnical Commission), CIS Critical Security Controls, and the NIST CSF. When the application refers to a cybersecurity framework using lower case letters, it means . . . a generic cybersecurity framework such as the frameworks just mentioned, e.g., a framework designed to help protect a computer network against data integrity loss, data integrity breach, data loss, unauthorized data disclosure, service loss, service outage, failure to protect data, or failure to recover data, etc. In contrast, when Cybersecurity Framework is capitalized, the application is specially referring to the NIST Cybersecurity Framework (CSF) and any other future versions of that framework.

Figure 2:
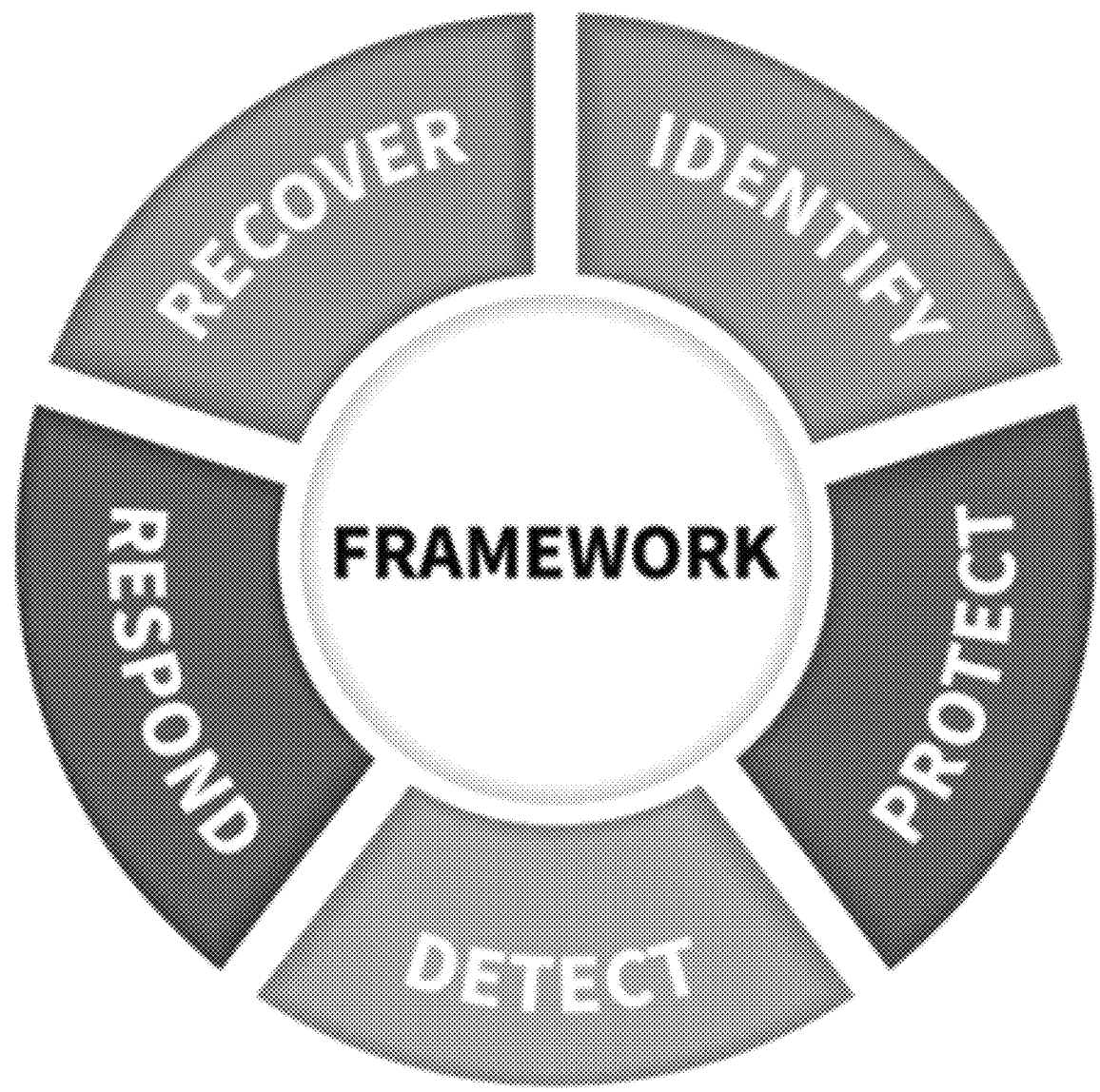
FIG. 2 shows a schematic of cybersecurity framework.

As shown in FIG. 2, the cybersecurity framework may comprise a protection capability and a recovery capability. A protection capability may comprise a protection function and an identification function. A recovery capability may comprise an identification function, detection function, respond function, and recover function.

A function may include one or more cybersecurity categories for a computer network to meet. Compliance with a cybersecurity category may be binary (pass/fail). Compliance may also be graded/scored on a scale (e.g., 1-5). The system and method may score the implementation quality of the security functions. The system and method may comprise a graphing module configured to graphically display the generated score. The system and method may comprise a cost expenditure analyzer configured to determine an expected cost expenditure to improve the score a certain amount. The system and method may comprise a cost savings analyzer configured to determine an expected cost savings for implementing the improvement. The system and method may be configured to determine controls and categories to improve that will likely generate a positive return on investment in a preset time period.

As shown in FIG. 1, one configuration of the present invention may relate to a system and method for determining protection and recovery capabilities of a computer network. Aspects of the present invention generally relate to systems and methods for determining the maturity of that computer network . . . in other words the strength and weaknesses of that computer network's cybersecurity policy including computer network's protection and recovery capabilities. The scoring logic may score how well or how poorly a computer network adheres to a premade standard for protection and recovery such as the CSF, COBALT, CIS, etc.

The network information gatherer 110 may gather user supplied data or feedback to determine a computer network's protection and recovery capabilities. The network information gatherer may gather information from control implementation data provided by user responses to a set of predefined questions. The questions may be grouped by the subcategories of the National Institute of Standards and Technology's (NIST) published Cyber Security Framework (CSF).

As shown in FIG. 1, the CNA 1 may comprise a network information gatherer 110 may comprise a data gatherer 117 configured to collect system control implementation data 110p about the computer network 10. The network information gatherer 110 may comprise a computer network survey 118 configured to obtain system information from a network operator or user. The computer network survey system 118a may be configured collect survey responses 118b. The computer network survey system 118a may present the network operator with a series of questions (a computer network survey 118) requiring survey responses 118b (answers to questions). The network information gatherer 100 may comprise a control information collector 119a configured to obtain control information 119b about the computer network 10 from a control implementation status (pass/fail) stored in an organization's (computer network's) Governance, Risk Management and Compliance (GRC) system or risk management framework (RMF) governance system database.

The network information gatherer 110 may comprise a question generator 112 to generate questions and an answer generator 114 to generate answers. The question generator may access an existing framework such as the CSF as source information from which to generate the question. The question generator 112 may comprise natural language programming and/or large language module to build the questions.

The questions may relate to implementation (actual or planned) of a computer network (for example protection and recovery capabilities). The network information gather may present a series of questions to a computer network operator in form of a survey. The series of questions may request the computer network operator provide information about the computer network's protection and recovery capabilities. The question generator may be configured to generate the following question.

"How frequently are computer network drives scanned for malware?"

The answer generator 114 may generate five answers to the question such as:

A) Never
B) We don't have a set schedule
C) I don't know the schedule
D) It's supposed to be every 3 months
E) It's done monthly, every month.

Answers may be correct, incorrect, partially correct, right wrong, worth a certain number of points, etc. The answer generator may program the scoring module such that the scoring module scores answers A-D all as zero. A palatability engine 116 may be configured to generate more "palatable" negative answers. For example, answers B-D are more "palatable negative answers" than A. Palatable negatives answers are specially formed negative answers that sound more reasonable as negative answers to the computer network operator or information security personnel, but they are still considered not compliant for the purposes of the scoring logic. The answer generator 114 and/or palatability engine 116 may be trained using artificial intelligence and machine learning techniques to: determine which answers are palatable and which are not; and generate palatable negative answers.

The Answer Integrity Analyzer 125

The CNA may comprise an answer integrity analyzer 125. The questions may be formatted so that the correct answer is not easily guessed by the computer network operator. The questions may comprise multiple answers that correlate to a zero score wherein some answers have the appearance as being more acceptable to the operator. For example:

An answer integrity analyzer 125 may be configured to determine whether answers supplied to the CNA 1 (the "answer set") by the operator are trustworthy, untrustworthy, or inconclusive. In some cases, the answer integrity analyzer 125 classifies the answers to supplied to the CNA 1 as trustworthy or untrustworthy. In some configurations, the answer integrity analyzer 125 will classify an answer set having an inconclusive level of trustworthiness as untrustworthy.

Question-Difficulty Classifier 127

The answer integrity analyzer may comprise a question-difficulty classifier 127 configured to assign a difficulty score associated with the difficulty (challenges) associated with implementing a control that relates to the survey question. For example, the question-difficulty classifier 127 may assign each question a difficulty score of easy, medium, or hard.

The question-difficulty classifier 127 may be configured to assign a value to one or more subparts. The question difficulty may be configured to divide the survey questions in G groups. In this example, G=3 (easy questions, medium questions, and hard questions.) The question-difficulty analyzer may be configured to calculate a difficulty score for each of the questions in the survey. The question-difficulty analyzer may be configured to assign questions having a total score that is less than X as easy, a total score that is greater than X but less than Y as medium, and a total score that is greater than Y as hard. Other configurations are contemplated. In some configurations, a survey question has a difficulty ranked easy, medium, or hard. A question having a difficulty of "easy" means that a total question score for that question as determined by question-difficulty analyzer is less than a total question score for a question having a medium difficulty. Similar, a question having a difficulty of "medium" means that a total question score for that question as determined by question-difficulty analyzer is less than a total question score for a question having a hard "difficulty."

In a configuration using a binary outcome (e.g., either the control is implemented or its not), the answer integrity analyzer may be configured to determine the answers in the answer set are trustworthy when the answers indicate that more easy difficulty controls are implemented than medium difficulty controls and more medium difficulty controls are implemented than hard difficulty controls. In a configuration using a binary outcome (e.g., either the control is implemented or its not), the answer integrity analyzer may be configured to determine the answers in the answer set are "untrustworthy" when less easy difficulty controls are implemented than medium difficulty controls or less medium difficulty controls are implemented than hard difficulty controls.

In some configurations, there may be an average difference of additional easy controls (as exemplified by correct answers to questions) that a computer network implements as compared to medium difficult controls. The "minimum required difference" would be the minimum number of additional easier controls that would need to be implemented for the answer-integrity analyzer to determine the answer set is trustworthy. For example, for computer networks that supply trustworthy answers to questions, the minimum required difference between easy control implemented and medium controls implemented might be 4 controls. E.g., 10 easy controls implemented, 6 medium controls implemented, and 1 hard control implemented. If the difference between the number of easy controls implemented and medium controls implemented is calculated to be greater than or equal to the minimum required difference, the answer integrity analyzer 125 might be deem the answer set to be trustworthy. But if the difference between the number of easy controls implemented and medium controls implemented is calculated to be less than the minimum required difference, but still more than number of medium controls implemented, the answer integrity analyzer 125 might be deem this answer set to be inconclusive. For example, 5 easy controls are implemented and 4 medium controls are implemented. The answer integrity analyzer might be configured to flag this computer network as having "potentially untrustworthy answers" or "inconclusive answers," because the number of easy controls implemented is less than the minimum required difference of 4. Or, the answer integrity analyzer 125 might simply determine the trustworthiness to be untrustworthy because the difference between easy control implemented and hard controls implemented is less than minimum required difference.

The CNA may comprise an answer integrity analyzer configured to determine that the answers in the answer set are untrustworthy when the answers indicate that less easy difficulty controls are implemented than medium difficulty controls and less medium difficulty controls are implemented than hard difficulty controls.

The answer integrity analyzer may be configured to (1) determine that the answers to the questions indicate that the computer network has implemented at least a first minimum number of easy difficulty controls as compared to medium difficulty controls; wherein the first minimum number is at least X; and/or (2) determine that the answers to the questions indicate that the computer network has implemented at least a second minimum number of medium difficulty controls as compared to hard difficulty controls; wherein the second minimum number is at least Y. The answer integrity analyzer may be configured to set a level of trustworthiness to the answers as: trustworthy if (1) and (2) are true; trustworthy if (1) or (2) is true; untrustworthy if (1) or (2) is true, untrustworthy if (1) and (2) are false. X and Y are natural numbers such as 4 and 3.

The answer integrity analyzer may be configured to: (1) determine that the answers to the questions indicate that the computer network has implemented less than a minimum number of easy difficulty controls as compared to medium controls; wherein the minimum number is at least X; and/or (2) determine that the answers to the questions indicate that the computer network has implemented less than a minimum number of additional medium difficulty controls as compared to hard difficulty controls; wherein the minimum number is at least Y. The answer integrity analyzer may be configured to set a level of trustworthiness to the answers as: untrustworthy if (1) and (2) are true; untrustworthy if (1) or (2) is true; trustworthy if (1) or (2) are false, trustworthy if (1) and (2) are false. X and Y are natural numbers such as 3 and 4.

The answer integrity analyzer may be configured to: (1) determine that the answers to the questions indicate that the computer network has implemented more medium difficulty controls than hard difficulty controls; and/or determine that the answers to the questions indicate that the computer network has implemented more easy difficulty controls than medium difficulty controls. The answer integrity analyzer may be configured to set a level of trustworthiness to the answers as: trustworthy if (1) and (2) are true; trustworthy if (1) or (2) is true; untrustworthy if (1) or (2) are false, untrustworthy if (1) and (2) are false.

The answer integrity analyzer may be configured to: (1) determine that the answers to the questions indicate that the computer network has implemented more hard difficulty controls than medium difficulty controls; and/or determine that the answers to the questions indicate that the computer network has implemented more medium difficulty controls than easy difficulty controls. The answer integrity analyzer may be configured to set a level of trustworthiness to the answers as: untrustworthy if (1) and (2) are true; untrustworthy if (1) or (2) is true; trustworthy if (1) or (2) are false, trustworthy if (1) and (2) are false.

The answer integrity analyzer may be configured to assign an answer set as inconclusive if: (1) the difference between the number of easy controls implemented and medium controls implemented is calculated to be less than the minimum required difference; or (2) the difference between the number of medium controls implemented and hard controls implemented is calculated to be less than the minimum required difference.

The computer network survey system 118a may be configured to transmit: a first question about a first control to the computer network; the first question comprising a first answer set and a first correct answer; a second question about a second control to the computer network; the second question comprising a second answer set and a second correct answer; a third question about a third control to the computer network; the third question comprising a third answer set and a third correct answer; and an $n^{th}$ question to the computer network; the $n^{th}$ question comprising a $n^{th}$ answer set and an $n^{th}$ correct answer. The first control, second control, third control, $n^{th}$ control may be the same control or they may be different controls. The first question, second question, third question, $n^{th}$ may be the same, may be different, may be the same but have different answers or a different answer set. The CNA may also comprise a data gatherer 117 configured to receive answers to the first question, second question, third question, and $n^{th}$ (n is a natural number.)

The computer network analyzer may comprise an answer integrity analyzer 125 configured to determine whether the first correct answer, second correct answer, third correct answer, $n^{th}$ correct answer supplied to the CNA from the computer network are trustworthy or untrustworthy. The question-difficulty classifier 127 configured to assign a difficulty score associated with challenges associated with implementing the first control, second control, third control, $n^{th}$ control.

A control's difficulty may comprise several subparts. The question-difficulty classifier 127 may be configured to assign the difficulty score of easy, medium, or hard to the first question, second question, and third question. The difficulty score may depend on: costs for the computer network to implement the control; a number of other systems that unable to implement the control, customizations of hardware in the computer network to implement the control; or employment or contracting of personnel with specialized knowledge to deploy the control; wherein specialized knowledge means the personnel has a graduate degree in a computer-related field.

The CNA may comprise a question-difficulty classifier is configured to assign the difficultly score of easy, medium, or hard; wherein a hard difficulty score requires more modifications to the hardware and the software of the computer network than a medium difficulty control; and a medium difficulty score requires more modifications to the hardware and the software of the computer network than an easy difficulty control.

The CNA may be configured to use item response theory to compute the computer network's system maturity. Classical Testing Theory (CTT) and Item Response Theory (IRT) are two fundamental approaches in psychometrics for analyzing test data. CTT focuses on overall test scores and assumes that each item contributes equally to the overall score, with an emphasis on observed scores, true scores, and measurement error. It is primarily concerned with the reliability and validity of the test as a whole. In contrast, IRT examines the properties of individual test items and how they relate to the latent trait being measured. IRT models the probability of a specific response to an item based on the item's characteristics and the respondent's ability level, providing a more detailed and nuanced understanding of item performance and allowing for more precise measurement across different levels of the trait.

IRT modeling generally utilizes an item response function (IRF). An IRF may graphically represent the nonlinear relationship between the probability of endorsing an item (e.g., not at all true vs. exactly true) on a scale given an individual's score on a latent trait variable (e.g., general perceived self-efficacy) and characteristics of that specific item (e.g., slope and threshold[s]). This relationship may be modeled using a logistic function that is monotonically increasing but can also be modeled using other functions (e.g., loglinear).

The Classical Theory Test (CTT) is an example of IRT. CTT can be used for many purposes such as sample dependency and test dependency. CTT is not configured to handle vertical scaling or adaptive scaling. "Classical Test Theory is distinct from Item Response Theory. CTT focuses on test-level statistics and assumes all items contribute equally to the overall score.

There are many other examples of IRT modeling such as unidimensional models like a dichotomous model (Rasch model, 1PL, 2PL, 3PL, etc.) or polytomous models like (Rasch partial credit or rating scale, partial credit, rating scales, grading scales, grade responses, etc.). IRT modeling also includes multidimensional models like compensatory, non-compensatory, bifactor, etc. The CNA may be configured to use both unidimensional and multidimensional item response theory (IRT) models such as Rasch Modeling. Rasch modeling may include objectively measuring latent traits in psychometric applications in education or clinical settings in healthcare. The CNA may be configured such that a Rasch modeler generates an output with scores for the protection and recovery capabilities on a 0-1 scale.

The CNA may be configured to determine a cost of maintaining the computer network at its current protection and recovery capabilities based on an extrapolation of projected attacks on the computer network. The system and method may be configured to project/determine a return on investment (ROI) for implementing additional protection and recovery steps. The system and method may determine potential hazards facing the computer network such as a loss (breach, disclosure, outage) over a given return period including distributions of impacts likely to occur for each loss type.

TABLE 1A

Exemplary Category Allocation 1

| PROTECTION | | RECOVERY | | |
|---|---|---|---|---|
| PROTECTION | IDENTIFY | DETECT | RESPOND | RECOVER |
| Access Control | Asset Management | Anomalies and Events | Response Planning | Recovery Planning |
| Awareness and Training | Business Environment | Security Continuous Monitoring | Communications | Improvements |
| Data Security | Governance | Detection processes | Analysis | Communications |
| Information Protection Processes and Procedures | Risk Assessment | | Mitigation | |
| Maintaining | Risk Assessment Strategy | | Improvements | |
| Protective Technology | Supply Chain Risk Management | | | |

Table 1A lists an example of category splits between the Protection Capability and Recovery Capability. For example, the Protection Capability comprises all of the Protection Function and some of the Identify Function. The Recovery Capability comprises all of the Detect Function, Respond Function, Recovery Function, and some of the Identify Function. In some configurations, the scoring logic could score some of the Identify Categories towards Protection Capability score and some of the Identify Categories towards the Recovery Capability score. In other configurations, the scoring logic could score successful implementation of controls by a computer network for the Identify Categories towards both the Protection and Recovery scores. In some configurations, the scoring logic is configured to double count Identify Categories when determining a maturity score.

TABLE 1B

Exemplary Category Allocation 2

| Protection Capability "Protection Bin" CSF Categories (7) | Recovery Capability "Recovery Bin" CSF Categories (11) | Protection and Recovery Categories "Mutual Bin" CSF Categories (5) |
|---|---|---|
| ID.RM | DE.AE | ID.AM |
| PR.AC | DE.CM | ID.BE |
| PR.AT | DE.DP | ID.GV |
| PR.DS | RS.RP | ID.RA |
| PR.IP | RS.CO | ID.SC |
| PR.MA | RS.AN | |
| PR.PT | RS.MI | |
| | RS.IM | |
| | RC.RP | |
| | RC.IM | |
| | RC.CO | |

Table 1B lists an example of category splits between Protection and Recovery Capability. A scoring logic configured to implement scoring according to Table 1B may score a first set of categories (e.g., 7) solely towards the Protection Capability Bin and a second set of categories solely towards a Recovery Capability Bin (e.g., 11). The "mutual bin" refers to those categories that comprise at least one subcategory of tests that the scoring logic would count towards the Protection Capability and at least subcategory that counts towards the Recovery Capability. In this example, there are 5 categories assigned to the Mutual Bin. Categories in the mutual bin may have some subcategories assigned the Protection Capability and some subcategories assigned the Recovery Capability. A bin is a group or bucket used by the scoring logic in determining a maturity score.

In some configurations, there is no overlap of categories in the first set, second set, and third set. In some configurations, there is no overlap of subcategories in any bin, meaning that the scoring logic would be configured to only count implementation of controls for a subcategory towards the Protection Capability or Recovery Capability—not both, e.g., exclusive OR.

The scoring logic may be configured to generate a maturity score by analyzing implementation of controls for a number of cybersecurity framework categories (e.g. 23). The scoring logic may be configured so that only the first set categories count towards just the Protection Capability and only the second set of categories count towards the Recovery Capability. The scoring logic may be configured to assign some of the subcategories of the third set of categories towards the protection score and some of subcategories of the third set of categories toward the recovery score.

Although Table 1B provides an explicit allocation of categories to capabilities, other allocations are contemplated. For example, in another configuration, a Protection Capability Bin could have 9 categories, the Recovery Capability Bin could have 10 categories, and the Mutual Bin could have 4 categories. Moreover, although the above example lists 23 total categories, some configurations of the invention may utilize more or less categories in determining a Protection Score, Recovery Score, and/or Maturity Score. Additionally, different categories may be used for different cybersecurity frameworks. As previous discussed, certain cybersecurity frameworks may comprise numerous subcategories. For example, the CSF contains a total 108 subcategories.

TABLE 1C

Exemplary Table of Protection Ability and Recovery Ability Subcategories

| Protection Ability CSF Subcategories (X) | Recovery Ability CSF Subcategories (108-X) |
|---|---|
| ID.AM-04 | DE.AE-01 |
| ID.AM-05 | DE.AE-02 |
| ID.AM-06 | DE.AE-03 |
| ID.BE-01 | DE.AE-04 |
| ID.BE-02 | DE.AE-05 |
| ID.BE-03 | DE.CM-03 |
| ID.GV-04 | DE.CM-01 |
| ID.RA-01 | DE.CM-07 |
| ID.RA-06 | DE.CM-02 |
| ID.RM-03 | DE.CM-06 |
| ID.RM-01 | DE.CM-08 |
| ID.RM-02 | DE.CM-05 |
| ID.SC-04 | DE.CM-04 |
| ID.SC-02 | DE.DP-02 |
| ID.SC-01 | DE.DP-04 |
| ID.SC-03 | DE.DP-01 |
| PR.AC-01 | DE.DP-03 |
| PR.AC-03 | DE.DP-05 |
| PR.AC-04 | ID.AM-03 |
| PR.AC-05 | ID.AM-01 |
| PR.AC-07 | ID.AM-02 |
| PR.AC-06 | ID.BE-04 |
| PR.AC-02 | ID.BE-05 |
| PR.AT-01 | ID.GV-01 |
| PR.AT-02 | ID.GV-03 |
| PR.AT-03 | ID.GV-02 |
| PR.AT-04 | ID.RA-05 |
| PR.AT-05 | ID.RA-04 |
| PR.DS-05 | ID.RA-03 |
| PR.DS-04 | ID.RA-02 |
| PR.DS-07 | ID.SC-05 |
| PR.DS-03 | RC.CO-03 |
| PR.DS-01 | RC.CO-01 |
| PR.DS-08 | RC.CO-02 |
| PR.DS-02 | RC.IM-01 |
| PR.DS-06 | RC.IM-02 |
| PR.IP-08 | RC.RP-01 |
| PR.IP-07 | RS.AN-01 |
| PR.IP-01 | RS.AN-03 |
| PR.IP-03 | RS.AN-05 |
| PR.IP-09 | RS.AN-02 |
| PR.IP-04 | RS.AN-04 |
| PR.IP-10 | RS.CO-02 |
| PR.IP-06 | RS.CO-03 |
| PR.IP-05 | RS.CO-01 |
| PR.IP-02 | RS.CO-04 |
| PR.IP-11 | RS.CO-05 |
| PR.IP-12 | RS.IM-01 |
| PR.MA-01 | RS.IM-02 |
| PR.MA-02 | RS.MI-03 |
| PR.PT-03 | RS.MI-01 |
| PR.PT-04 | RS.MI-02 |
| PR.PT-01 | RS.RP-01 |
| PR.PT-05 | |
| PR.PT-02 | |

Exemplary List of Categories and Definitions

Identify Categories

ID.AM Asset Management (ID.AM): The data, personnel, devices, systems, and facilities that enable the organization to achieve business purposes are identified and managed consistent with their relative importance to organizational objectives and the organization's risk strategy.

ID.BE Business Environment (ID.BE): The organization's mission, objectives, stakeholders, and activities are understood and prioritized; this information is used to inform cybersecurity roles, responsibilities, and risk management decisions.

ID.GV Governance (ID.GV): The policies, procedures, and processes to manage and monitor the organization's regulatory, legal, risk, environmental, and operational requirements are understood and inform the management of cybersecurity risk.

ID.RA Risk Assessment (ID.RA): The organization understands the cybersecurity risk to organizational operations (including mission, functions, image, or reputation), organizational assets, and individuals.

ID.RM Risk Management Strategy (ID.RM): The organization's priorities, constraints, risk tolerances, and assumptions are established and used to support operational risk decisions.

ID.SC "Supply Chain Risk Management (ID.SC): The organization's priorities, constraints, risk tolerances, and assumptions are established and used to support risk decisions associated with managing supply chain risk. The organization has established and implemented the processes to identify, assess and manage supply chain risks."

Protection Categories

PR.AC Identity Management, Authentication and Access Control (PR.AC): Access to physical and logical assets and associated facilities is limited to authorized users, processes, and devices, and is managed consistent with the assessed risk of unauthorized access to authorized activities and transactions.

PR.AT Awareness and Training (PR.AT): The organization's personnel and partners are provided cybersecurity awareness education and are trained to perform their cybersecurity-related duties and responsibilities consistent with related policies, procedures, and agreements.

PR.DS Data Security (PR.DS): Information and records (data) are managed consistent with the organization's risk strategy to protect the confidentiality, integrity, and availability of information.

PR.IP Information Protection Processes and Procedures (PR.IP): Security policies (that address purpose, scope, roles, responsibilities, management commitment, and coordination among organizational entities), processes, and procedures are maintained and used to manage protection of information systems and assets.

PR.MA Maintenance (PR.MA): Maintenance and repairs of industrial control and information system components are performed consistent with policies and procedures.

PR.PT Protective Technology (PR.PT): Technical security solutions are managed to ensure the security and resilience of systems and assets, consistent with related policies, procedures, and agreements.

Detection Categories

DE.AE Anomalies and Events (DE.AE): Anomalous activity is detected and the potential impact of events is understood.

DE.CM Security Continuous Monitoring (DE.CM): The information system and assets are monitored to identify cybersecurity events and verify the effectiveness of protective measures.

DE.DP Detection Processes (DE.DP): Detection processes and procedures are maintained and tested to ensure awareness of anomalous events.

Respond Categories

RS.RP Response Planning (RS.RP): Response processes and procedures are executed and maintained, to ensure response to detected cybersecurity incidents.

RS.CO Communications (RS.CO): Response activities are coordinated with internal and external stakeholders (e.g., external support from law enforcement agencies).

RS.ANAnalysis (RS.AN): Analysis is conducted to ensure effective response and support recovery activities.

RS.MI Mitigation (RS.MI): Activities are performed to prevent expansion of an event, mitigate its effects, and resolve the incident.

RS.IM Improvements (RS.IM): Organizational response activities are improved by incorporating lessons learned from current and previous detection/response activities.

Recover Categories

RC.RP Recovery Planning (RC.RP): Recovery processes and procedures are executed and maintained to ensure restoration of systems or assets affected by cybersecurity incidents.

RC.IM Improvements (RC.IM): Recovery planning and processes are improved by incorporating lessons learned into future activities.

RC.COCommunications (RC.CO): Restoration activities are coordinated with internal and external parties (e.g. coordinating centers, Internet Service Providers, owners of attacking systems, victims, other CSIRTs, and vendors).

Subcategories

A category in CSF or other cybersecurity frameworks may comprise one, two, three or more subcategories. As an example, assume the ID.AM category comprises 5 subcategories. ID.BE-1, ID.BE-2 . . . . ID.BE-5. Each of subcategories would have its own definition that the network response analyzer would need to analyze to determine whether sufficient controls/measures have been implemented. For example, the definition of ID.BE-1 could be, "The organization's role in the supply chain is identified and communicated." The definition of ID.BE-2 could be, "The organization's place in critical infrastructure and its industry score is identified and communicated." The scoring logic may be configured so that a single subcategory is assigned to either the Protection Bin or Recovery Bin.

System and Method Architecture

The system and method may be embodied as a computer network analyzer (CNA) 1, FIG. 1. The computer network analyzer (CNA) may comprise a processor, memory, system bus, network interface, display interface, peripherals, tangible computer readable media, and specialized software non-transitorily stored on tangible computer readable media. The software or computer code may comprise executable instructions for the processor to execute. Collectively, this computer and its various hardware and software configurations may be referred to as a computer network analyzer.

The computer network analyzer (CNA) may evaluate various criteria when analyzing a computer network's protection and recovery capabilities. The computer network analyzer may determine a computer network's recovery score to be a measurement of how many categories the computer network satisfies. For example, there may be X categories that relate to a computer network's recovery capabilities and protection capabilities. A given computer network may meet Y of those categories. The computer network analyzer may assign each category a relative or absolute weight.

A table generator 135 may be configured to generate Table 2A. The specification and figures depict the use of a table (a type of data structure), however other data structures could be used. The data structure itself could be stored in a database 200. The CNA may comprise the database or be connected to the database 200. Various components of the CNA (such as network response analyzer 120, scoring logic, table generator 135, graphing module 140, data modeler 20, recommendation engine, etc.) may be configured to save data (e.g., information, entries, etc.) into the database 200. The CNA and the components may be configured to retrieve data from the database, run queries in the database, etc.

A database 200 may comprise data entries (e.g., rows in a table). A database may comprise a processor, storage, memory, a network interface, a display, keyboard, etc. A database may be controlled by a database management system (DBMS). Collectively, the data entries, structural components, and DBMS are referred to as a database. Data within databases may be modeled in rows and columns in a series of tables to make processing and data querying efficient. Structured query language (SQL) may be used to write, query, and retrieve data. SQL is a programming language used by some relational databases to query, manipulate, and define data, and to provide access control. The database may take the form of a blockchain or relational database.

Figure 4:
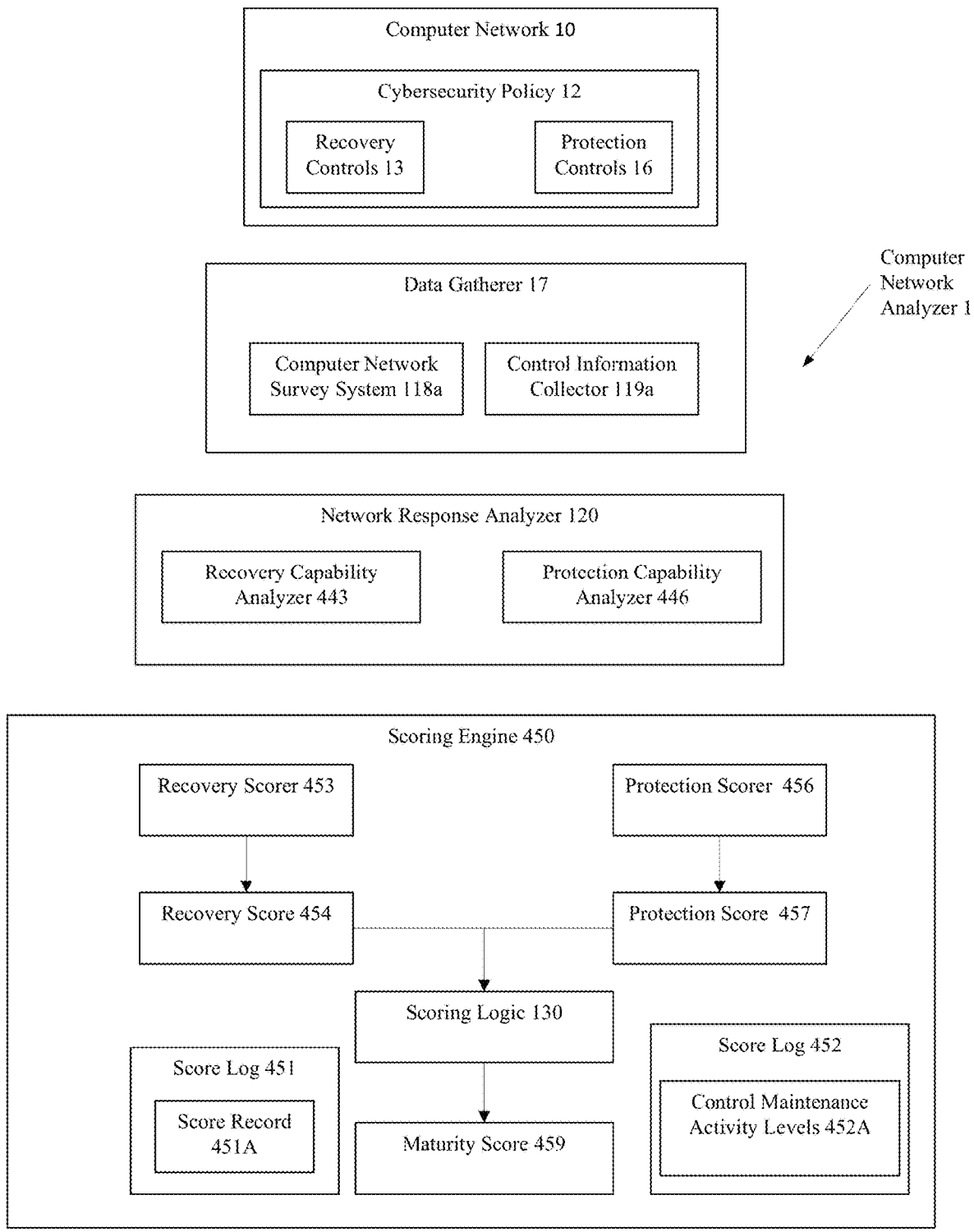
FIG. 4 shows an additional view of the computer network analyzer.

The CNA may be configured to invoke the scoring logic to calculate or determine various scores within the table. In this example, category ID.AM has a weight of 6, while ID.BE has a weight of 5. A category ID is an abbreviation for a category. FIG. 4 shows a listing of 5 functions and the 23 categories. Alternating weighting schemes may be used than the one shown. Table 2A shows that each category ID can be scored from 0-5, although alternate scoring technique may be used. Qualitative labels may be applied to the numeric score 0=none, 1=poor, 2=below standard, 3=adequate, 4=above average, 5=excellent, etc. In some configurations, the computer network analyzer will multiple the weighting by the score to get a category score.

TABLE 2A

Exemplary Scoring Algorithm 1

| Function | Total Function Score | Cat ID | 0 | 1 | 2 | 3 | 4 | 5 | Weighting | Category Score |
|---|---|---|---|---|---|---|---|---|---|---|
| IDENTIFY | Σ (Cat. ID × Weighting) = 86 | ID.AM | | | | | 4 | | 6 | 24 |
| | | ID.BE | | | | 3 | | | 5 | 15 |
| | | ID.GV | | | | | | | 4 | 0 |
| | | ID.RA | | | 2 | | | | 6 | 12 |
| | | ID.RM | | | | | | 5 | 3 | 15 |
| | | ID.SC | | | | | 4 | | 5 | 20 |
| PROTECT | Σ (Cat. ID × Weighting) = 113 | PR.AC | | | | 3 | | | 7 | 21 |
| | | PR.AT | | | | | 4 | | 5 | 20 |
| | | PR.DS | | | | | | 5 | 8 | 40 |
| | | PR.IP | | 1 | | | | | 12 | 12 |
| | | PR.MA | 0 | | | | | | 2 | 0 |
| | | PR.PT | | | | | 4 | | 5 | 20 |

TABLE 2A-continued

Exemplary Scoring Algorithm 1

| Function | Total Function Score | Cat ID | 0 | 1 | 2 | 3 | 4 | 5 | Weighting | Category Score |
|---|---|---|---|---|---|---|---|---|---|---|
| DETECT | Σ (Cat. ID × Weighting) = 36 | DE.AE |  |  |  | 3 |  |  | 5 | 15 |
|  |  | DE.CM |  |  | 2 |  |  |  | 8 | 16 |
|  |  | DE.DP |  | 1 |  |  |  |  | 5 | 5 |
| RESPOND | Σ (Cat. ID × Weighting) = 63 | RS.RP |  |  |  | 3 |  |  | 1 | 3 |
|  |  | RS.CO |  |  |  |  | 4 |  | 5 | 20 |
|  |  | RS.AN |  |  |  |  | 4 |  | 5 | 20 |
|  |  | RS.MI |  |  |  |  | 4 |  | 3 | 12 |
|  |  | RS.IM |  |  |  |  | 4 |  | 2 | 8 |
| RECOVER | Σ (Cat. ID × Weighting) = 25 | RC.RP | 0 |  |  |  |  |  | 1 | 0 |
|  |  | RC.IM |  |  |  |  |  | 5 | 2 | 10 |
|  |  | RC.CO |  |  |  |  |  | 5 | 3 | 15 |
| Total Score | 323 |  |  |  |  |  |  |  |  |  |

The computer network analyzer (CNA) may be configured to calculate a product of each of the category scores. The computer network analyzer (CNA) may determine a score for each category and multiply the score by the weight to determine a category score. The CNA may calculate a total function score by summing all the category scores. In the example shown in Table 2A, the CNA may generate five scores. Identify=86; Protect=113; Detect=36; Respond=63; Recover=25. A total score of all 5 function for this example would be 323. A maximum score in this example would be 540. In some configurations, the scoring logic may be configured to generate a maturity score by dividing the total score by the maximum score. 323/540 yielding=0.59 as a possible maturity score.

TABLE 2B

Exemplary Scoring Algorithm 2

| Capability | Function | Total Function Score | Cat ID | 0 | 1 | 2 | 3 | 4 | 5 | Weighting | Category Score |
|---|---|---|---|---|---|---|---|---|---|---|---|
| Protection | IDENTIFY | Σ (Cat. ID × Weighting) = 86 | ID.AM |  |  |  |  | 4 |  | 6 | 24 |
|  |  |  | ID.BE |  |  |  | 3 |  |  | 5 | 15 |
|  |  |  | ID.GV |  |  |  |  |  |  | 4 | 0 |
|  |  |  | ID.RA |  |  | 2 |  |  |  | 6 | 12 |
|  |  |  | ID.RM |  |  |  |  |  | 5 | 3 | 15 |
|  |  |  | ID.SC |  |  |  |  | 4 |  | 5 | 20 |
|  | PROTECT | Σ (Cat. ID × Weighting) = 81 | PR.AC |  |  |  | 3 |  |  | 7 | 21 |
|  |  |  | PR.AT |  |  |  |  | 4 |  | 5 | 20 |
|  |  |  | PR.DS |  |  |  |  |  | 5 | 8 | 40 |
| Recovery |  | Σ (Cat. ID × Weighting) = 32 | PR.IP |  | 1 |  |  |  |  | 12 | 12 |
|  |  |  | PR.MA | 0 |  |  |  |  |  | 2 | 0 |
|  |  |  | PR.PT |  |  |  |  | 4 |  | 5 | 20 |
|  | DETECT | Σ (Cat. ID × Weighting) = 36 | DE.AE |  |  |  | 3 |  |  | 5 | 15 |
|  |  |  | DE.CM |  |  | 2 |  |  |  | 8 | 16 |
|  |  |  | DE.DP |  | 1 |  |  |  |  | 5 | 5 |
|  | RESPOND | Σ (Cat. ID × Weighting) = 63 | RS.RP |  |  |  | 3 |  |  | 1 | 3 |
|  |  |  | RS.CO |  |  |  |  | 4 |  | 5 | 20 |
|  |  |  | RS.AN |  |  |  |  | 4 |  | 5 | 20 |
|  |  |  | RS.MI |  |  |  |  | 4 |  | 3 | 12 |
|  |  |  | RS.IM |  |  |  |  | 4 |  | 2 | 8 |
|  | RECOVER | Σ (Cat. ID × Weighting) = 25 | RC.RP | 0 |  |  |  |  |  | 1 | 0 |
|  |  |  | RC.IM |  |  |  |  |  | 5 | 2 | 10 |
|  |  |  | RC.CO |  |  |  |  |  | 5 | 3 | 15 |
| Total Score (Protection, Recovery) |  | (167, 156) |  |  |  |  |  |  |  |  |  | capability and a score for each category ID that is in the recovery capability. Note, the table shows PR.AC, PR.AT and PR.DS are in the protection capability and PR.IP, PR.MA and PR.PT in the recovery category. These are exemplary only and other groupings are possible. and multiply the score by the weight to determine a category score. The CNA may calculate a total function score for each capability by summing all the category scores in the capability. In the example shown in Table 2B, the CNA may generate six scores. Identify=86; Protect (in Protection capability)=81; Protect (in Recovery capability)=32; Detect=36; Respond=63; Recover=25. The scoring logic may calculate a total score for the protection capability of 167 and a total recovery score of 156 (167,156). The scoring logic may also The table generator 135 may be configured to generate Table 2B. The computer network analyzer (CNA) may be configured to calculate the protection and recovery scores independently. The computer network analyzer (CNA) may determine a score for each category ID that is the protection determine a maximum score of (245, 295). In some configurations, the scoring logic may be configured to generate a maturity score by dividing the total score by the maximum score. (167/245, 156/295) yielding=(0.68,0.52) as a possible maturity score. The scoring logic may be configured to use the scoring algorithm like that shown Table 2B with the Category Allocation Table like that show in Table 1A to arrive a maturity score.

of the weighting for each subcategory times the maximum raw score (5 in this example) and then summing the products for all the subcategories.

TABLE 2C

Exemplary Scoring Algorithm 3

| 1 | A | B<br>Capability Bin | C<br>Function | D<br>Total Function Score | E<br>Cat ID | F<br>0 | G<br>1 | H<br>2 | I<br>3 | J<br>4 | K<br>5 | L<br>Weighting | M<br>Category Score |
|---|---|---|---|---|---|---|---|---|---|---|---|---|---|
| 2 | | Protection | PROTECT | Σ (Cat. ID × | ID.RM | | | | | 4 | | 6 | 24 |
| 3 | | | | Weighting) = 107 | PR.AC | | | | 3 | | | 5 | 15 |
| 4 | | | | | PR.AT | | | | | | | 4 | 0 |
| 5 | | | | | PR.DS | | | 2 | | | | 6 | 12 |
| 6 | | | | | PR.IP | | | | | | 5 | 3 | 15 |
| 7 | | | | | PR.MA | | | | | 4 | | 5 | 20 |
| 8 | | | | | PR.PT | | | | 3 | | | 7 | 21 |
| 9 | | Mutual Bin | IDENTIFY | Σ (Cat. ID × | ID.AM | | | | | 4 | | 5 | 20 |
| 10 | | | | Weighting) = 92 | ID.BE | | | | | | 5 | 8 | 40 |
| 11 | | | | | ID.GV | | 1 | | | | | 12 | 12 |
| 12 | | | | | ID.RA | 0 | | | | | | 2 | 0 |
| 13 | | | | | ID.SC | | | | | 4 | | 5 | 20 |
| 14 | | Recovery | DETECT | Σ (Cat. ID × | DE.AE | | | | 3 | | | 5 | 15 |
| 15 | | | | Weighting) = 36 | DE.CM | | | 2 | | | | 8 | 16 |
| 16 | | | | | DE.DP | | 1 | | | | | 5 | 5 |
| 17 | | | RESPOND | Σ (Cat. ID × | RS.RP | | | | 3 | | | 1 | 3 |
| 18 | | | | Weighting) = 63 | RS.CO | | | | | 4 | | 5 | 20 |
| 19 | | | | | RS.AN | | | | | 4 | | 5 | 20 |
| 20 | | | | | RS.MI | | | | | 4 | | 3 | 12 |
| 21 | | | | | RS.IM | | | | | 4 | | 2 | 8 |
| 22 | | | RECOVER | Σ (Cat. ID × | RC.RP | 0 | | | | | | 1 | 0 |
| 23 | | | | Weighting) = 25 | RC.IM | | | | | | 5 | 2 | 10 |
| 24 | | | | | RC.CO | | | | | | 5 | 3 | 15 |
| 25 | | Protection Score= | 130 | Recovery Score= | 193 | | | | Total Score = (130, 193)<br>(Protection, Recovery) | | | | Max Scores<br>(270, 470) |

The table generator 135 may be configured to generate Table 2C. The computer network analyzer (CNA) may determine a score for each category ID. The scoring logic may assign that score towards a Capability Bin, Recovery Bin, or a Mutual Bin. The score shown cell M2 may actually comprise a number of subscores. Recall that a category may comprise one or more subcategories. The scoring logic may determine a score for each subcategory by determining the strength of the implementation of the control (scoring the implementation from 0-5 in this example) and applying the weighting (using multiplication in this example.) If a particular category comprises 6 subcategories, the category score may be composed of 6 subscores. In other words, since each category may comprise a plurality of subcategories . . . the total score for the category may be the average or median score of the category*the weighting for the category. Or, the total score for the category could be the total score for all subcategories in the category*the weighting. In some configurations, the scoring logic may assign a specific weighting for each subcategory or the scoring logic may use the same weighting for each subcategory in each category. In some configurations, the scoring logic might not implement a weighting for one or more categories/subcategories. The scoring logic may be configured to determine a product of the weighting*the raw score of the subcategory for all the subcategories within the Protection Bin, Mutual Bin, and Recovery Bin.

In this example, the scoring logic may be determine the total Protection Score to be 130 and the total Recovery Score is 193. (130, 193). The scoring logic may also determine a maximum score of 270 for the Protection score and a maximum score of 470 for the Recovery Score. The maximum score could be calculated by determining the product In some configurations, the scoring logic may be configured to generate a maturity score by dividing the total score by the maximum score. (130/270, 193/470) yielding a weighted maturity score of (0.48, 0.41).

In Table 2C, the subcategories for the categories are not shown. For the purposes of the example, ¼ of the subcategories in the Mutual Bin were counted by the scoring logic towards the Protection Capability score and ¾ of the subcategories in the Mutual Bin were counted towards the Recovery Capability score.

FIGS. 7A-7E: Exemplary Scoring Algorithm 4

The table generator 135 may be configured to generate the table shown in FIGS. 7A-7E. Column A contains grouping information for capabilities including Protection capability and Recovery capability. Colum B shown the 5 functions (Protection, Identify, Detect, Respond, Recover). Column C illustrates an equation the scoring logic or CNA may use to determine a total function score. The total function score is also illustrated in Column J. The category identifier (abbreviated Cat ID) is shown in Column D. The subcategory ID is shown column E. Some configurations of the invention may illustrate 20, 40, 50, 75, 100, 200+, subcategory IDs. Column F shows that the table generator may be configured to determine, generate, and display a capability allocation associating the subcategory ID either with the protection capability exclusive or the recovery capability, but not both. In other configurations, the table generator may be configured to determine, generate, and display a capability allocation associating the subcategory ID either with the protection capability nonexclusive or the recovery capability, could be both. The CNA can assign a specific subcategory ID to either the Protection or Recovery capability. The CNA may assign a score based on its analysis of the computer network 10 to each subcategory ID (column I, the subcategory score). In this example, the score ranges from 0-5, but other scoring systems are contemplated. The scoring logic may also assign a subcategory weighting to each score/subcategory ID. In the example shown in FIGS. 7A-7E, the weight ranges from 1-20. The scoring logic can determine a total subcategory ID score by multiplying the subcategory ID score (column G) by the subcategory weighting (column H).

The table generator may comprise a capability allocator for associating the subcategory ID either with the protection capability or the recovery capability. The table generator may comprise a subcategory calculator configured to determine a total subcategory ID score; a function calculator configured to determine a total function score; a capability calculator configured to use the capability allocation, total subcategory ID score, and total function score to generate a total protection score and a total recovery score; and a maximum score calculator configured to determine a maximum protection score and a maximum recovery score. The table generator may comprise a maturity score calculator configured to determine a maturity score containing a 2×1 array; and the graphing module configured to generate a graph comprising the maturity score.

The maturity score calculator may be configured to: determine a first element in the 2×1 array by dividing the total protection score by the maximum protection score; and determine a second element in the 2×1 array by dividing the total recovery score by the maximum recovery score. The 2×1 array may be a coordinate and the first element may be an X coordinate and the second element may be a Y coordinate.

Figure 3:
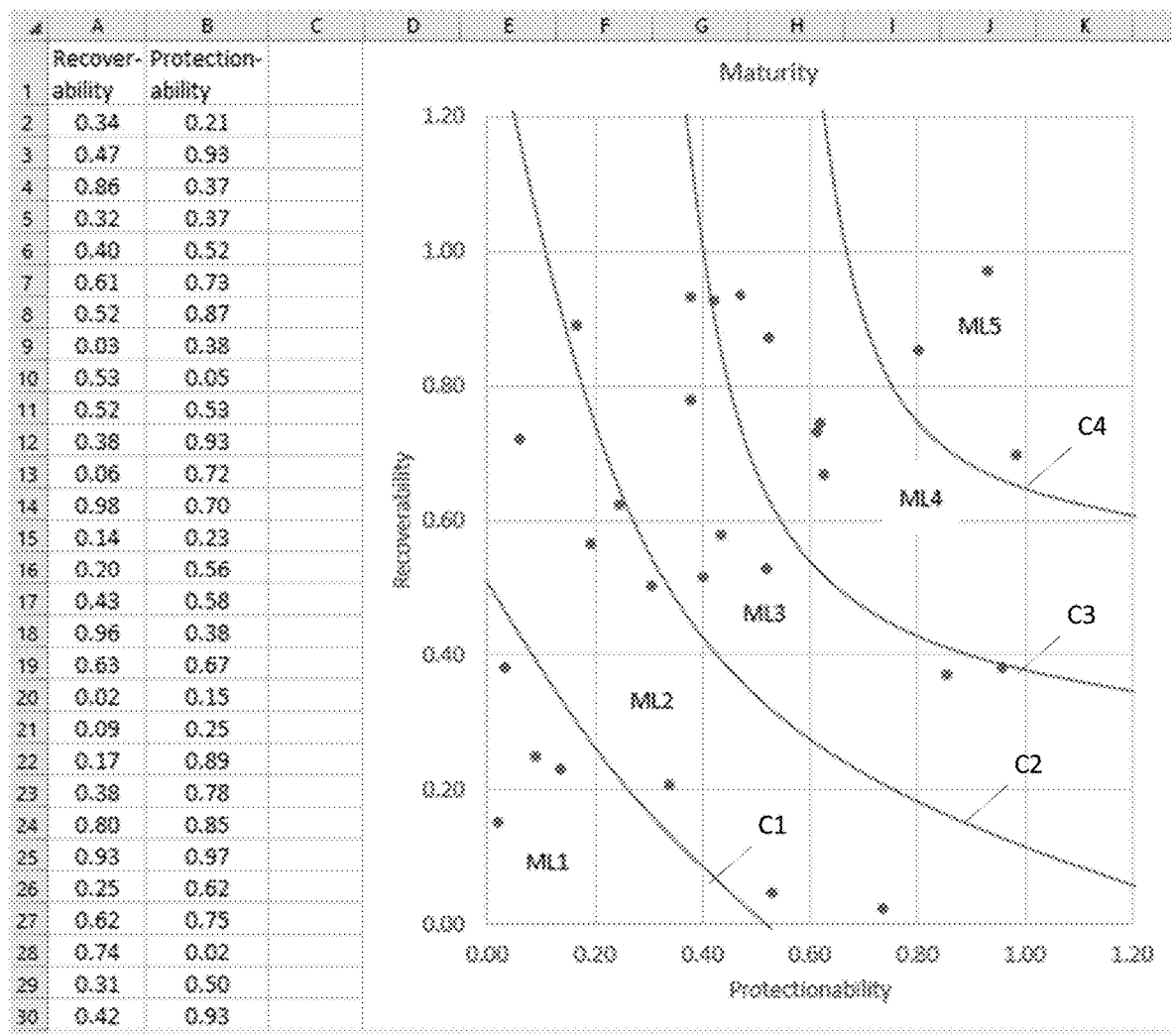
FIG. 3 shows a graph generated by a graphic module.

The graphing module may be configured to draw lines on the graph as shown in FIG. 3. The first curved line (C1) may have the formula $R_1=f^1(P_1)$; the second curved line may have the formula $R_2=f^2(P_2)$; the third curved line may have the formula $R_3=f^3(P_3)$; and a fourth curved line may have the formula $R_4=f^4(P_4)$. R=recovery capability value; P=recovery capability value, $f^1$, $f^2$, $f^3$, and $f^4$ are functions of the line. For example, $f^1$ could be . . . −3× . . . so $R_1=-3\times P_1$. $f^2$=could be^−2, so $R_2=(P_2)^{-2}$. $F^3$ and $f^4$ are also functions. The values for the functions may be offset but otherwise the same e.g., $R_1=2\times P_1^3+B_1$ and $R_2=2\times P_2^3+B_2$ (wherein $B_1$, $B_2$ is an offset number or integer). In other cases, the functions may be completely different: $R_1=\log(P_1)+B_1$ and $R_2=2\times P_2+B_1$. Other configurations may have one, two, three, five, or n "curved lines," wherein n is a natural number. A straight line is a curved line with a radius of curvature of zero (e.g., curved lines include the subset of straight lines). As shown in FIG. 3, all the lines are curved with a radius of curvature larger than zero, and all of the curvatures are different. C4 has the largest curvature and C1 the smallest curvature.

The graphing module may be configured to set a first maturity rank to ML1, if the maturity score has a coordinate value that is less than or equal to all coordinate values on the first curved line. The graphing module may be configured to set a second maturity rank to ML2, if the maturity score has a coordinate value that is greater than any value on the first curved line, but less than all coordinates values on the second curved line. The graphing module may be configured to set a third maturity rank to ML3, if the maturity score has a coordinate value that is greater than any value on the second curved line, but less than all coordinates values on the third curved line. The graphing module may be configured to set a fourth maturity rank to ML4, if the maturity score has a coordinate value that is greater than any value on the third curved line, but less than all coordinates values on the fourth curved line. The graphing module may be configured to set a fifth maturity rank to ML5, if the maturity score has a coordinate value that is greater than any value on the fourth curved line, but less than all coordinates values on the fourth curved line. Alternate configurations of the graphing module are conceived that make adjustments to comparators. For example, for setting the second maturity rank, the graphing module may also be configured "to set a second maturity rank to ML2, if the maturity score has a coordinate value that is greater than or equal to any value on the first curved line, but less than or equal to all coordinates values on the second curved line."

The graphing module may be configured to generate a graph comprising a plurality of maturity score. The graph in FIG. 6 for example comprises 29 maturity scores. The CNA may be configured to display a plurality of maturity scores to the operator of computer network or the CNA. Graphs created by the graphing module may be included in a recommendation report 181 prepared by the recommendation engine 180.

The CNA can be used to analyze protection and recovery capabilities of many computer networks (a first computer network, a second computer network, a third computer network . . . $n^{th}$ computer network, etc.) The database may save entries in the database comprising scores, ranks, recommendation reports, data models 21, etc. of the computer networks.

The output of the graphing module (the graph) will vary based on the maturity score of the computer networks that are in the database. The graphic module may request entries of some or all of computer networks in the database when generating the graph. The entries may comprise a computer network name, protection score, recovery score, etc. The entries may comprise individual scoring tables such as the tables shown in FIGS. 7A-7A. The graphing module may create graphs from data in the tables like FIGS. 7A-7E for multiple computer networks.

As an example, the a graph generated by the graphing module may comprise: a first maturity score, a second maturity score, and a third maturity score. The maturity scores may have different coordinate values but all have a maturity level of 1 (e.g. the coordinate value of all of the maturity scores is less than any point on the first curved line.

To determine a total Protection capability score, the scoring logic can sum all total subcategory ID scores assigned to the Protection capability. In this example, the total is 1626. The scoring logic can also determine a maximum possible score. The maximum score can be calculated by setting all Protection subcategory ID scores equal to the maximum value (5 in this example). When the scoring logic multiplies the subcategory ID score (5, in this example) by the subcategory weighting (column H), the maximum possible value will be determined and stored in column I. To determine the maximum possible Protection score, the scoring logic can sum all total subcategory ID scores to determine the maximum possible Protection score 3005. Other calculations methods are contemplated.

To determine a total Recovery capability score, the scoring logic can sum all total subcategory ID scores assigned to the Recovery capability. In this example, the total is 1544. The scoring logic can also determine a maximum possible score. The maximum score can be calculated by setting all Protection subcategory ID scores equal to the maximum value (5 in this example). When the scoring logic multiplies the subcategory ID score (5, in this example) by the subcategory weighting (column H), the maximum possible value will be determined and stored in column I. To determine the maximum possible Recovery score, the scoring logic can sum all total subcategory ID scores to determine the maximum possible Recovery score 3045. Other calculations methods are contemplated.

In some configurations, the scoring logic may be configured to generate a maturity score by dividing the total score by the maximum score. (1715/3005, 1544/3045) yielding a weighted maturity score of (0.57, 0.51) rounded to nearest 0.01.

Graphing Processes

The CNA may be equipped with a graphing module and scoring logic as previously discussed. The graphing module may be configured to cluster all scores of all systems within a specific range of values for example (0-2, 1-5, 1-10, etc.) The scoring logic may be configured to generate a protection score and a recovery score on a scale such as ML1-ML5 (ML meaning maturity level). The graphing module may graph these scores on an X and Y axis. ML1-ML5 may be considered a rating or a score range.

Computer networks with an ML1 rating would be the lowest level of maturity and may correspond to computer networks that the graphing modules would plot in the lowest 10% of the unit square's area. Computer networks in the lowest 10% represent systems that are at a highest risk of loss due to their low capability and poorly implemented security controls against their required baseline.

Computer networks with an ML2 rating would occupy an area on the graph that rank higher than 10% but lower than 33%. When taken together, ML1 and ML2 represent the bottom third of computer network cybersecurity performance based on their calculated capabilities plotted as a coordinate pair on the X-Y plane. Systems plotting in ML2 are at risk of experiencing a loss that is likely beyond the risk tolerances of most enterprise governance policies.

The graphing module may be configured to plot computer networks with an ML3 rating-based on their (protection, recovery) pair—in the interval forming the center 33% to 66% of the unit square. A computer network with an ML3 rating range may be considered as meeting potential minimum levels of control implementation based on government risk tolerances as defined by the Risk Management Framework.

The graphing module may be configured to plot computer networks with an ML4 rating-based on their (protection, recovery) pair—in the interval forming the center 67% to 90% of the unit square.

The graphing module may be configured to plot computer networks with an ML5 rating-based on their (protection, recovery) pair—in the interval above 90%. A system with an ML5 rating may be considered as nearly perfectly implementing their required set of controls based on their system categorization (High, Mod, Low) and the organization's corresponding control baseline for the given categorization.

FIG. 3 also shows 30 maturity scores for 30 exemplary computer networks. In the configuration shown in FIG. 3, the CNA may use Rasch modeling so that all protection & recovery scores are adjusted to fall within a distribution or curve between 0-1 as shown.

As shown in FIG. 1, the CNA may comprise a graphing module configured to graph a computer network's maturity. The CNA may analyze a computer network according to two capabilities: a protection capability and a recovery capability. For example, a protection capability may include activities aligned to the identify category and the protection category. The recovery capability may include activities aligned to the identify category, detect category, respond category, and recover category. The CNA may comprise a protection scorer and recovery scorer configured to process control failures or non-implementations as inputs. The CNA may be configured to assign a severity to one or more control failures or non-implementations.

The CNA may calculate a computer network maturity based on the formula $M=f(P,R)$. For example, maturity may be a function of protection capabilities (P) and recovery capabilities I. Various functions may be used. For example, the system and method may compute a weighted score from 1-5 of a computer network's protection and recovery capabilities. A simple example might be $M=P+R$ or $M=P \times R$.

The graphing module may plot the recovery score on the Y-axis and the protection score on the X-axis forming a point on a recovery-protection graph (or vice versa). The method and system could plot a second, third . . . $n^{th}$ computer network's maturity to form a graph having a plurality of plotted maturities for a plurality of computer networks. This graph could show a user their computer network's recovery and protection capabilities relative to other computer networks.

The system and method may categorize the computer network based on applicable FISMA security requirements and an associated control baseline as defined in the NIST Special Publication 800-53 (Revision 4 & 5). NIST Special Publication 800-53 (Revision 4 & 5) relates to controls required for system authorization for secure production in support of government requirements. Other frameworks may be used such as COBIT or ISO.

Protection and Recovery Capabilities

FIG. 4 shows a configuration of the CNA comprising a network response analyzer 120 configured to analyze a system's control capabilities. The network response analyzer 120 may comprise recovery capability analyzer 443 configured to perform calculations on the responses to determine the computer network's recovery capabilities. A protection capability analyzer 446 may be configured to perform calculations on the responses to determine the computer network's protection capabilities.

A scoring logic 130 may comprise a recovery scorer 453 which may be configured to generate a score of the computer network's recovery capabilities. The scoring engine 450 may also comprise a protection scorer 456 which may be configured to generate a score of the computer network's protection capabilities. The scoring engine 450 may also comprise a scoring logic 130 which may be configured to generate a maturity score of the computer network's combined recovery and protection capabilities.

The recovery scorer 453 and protection scorer 456 may be configured to generate a recovery score 454 and protection score 457. A recovery score 454 and protection score 457 may comprise a plurality control scores. A control score may be binary (e.g., pass/fail) or it may be assigned a numeric value with a range (e.g., 1-5). The recovery scorer 453 and protection scorer 456 may weight certain controls more heavily than others. A control (such as recovery control 13 or protection control 16) is an operation or process performed by the computer network or its administrator(s) to enhance computer network security (cybersecurity). It is part of an overall cybersecurity policy 12 for that computer network 10.

Recovery controls 13 and protection controls 16 may protect the computer network from breach or provide aid in recovery from loss or other adverse action. Some recovery controls and protection controls may play a more important role in protecting the computer network than others. The recovery scorer and protection scorer may be configured to determine an importance of a recovery control and protection control and assign it an adjustment factor (a weighting).

More important protection controls and recovery controls may have a higher adjustment factor. Recovery controls and protection controls with a higher adjustment factor may be more important to the recovery score and protection score. The scoring logic 458 may perform a function on the recovery score and protection score to determine a maturity score 459. In other cases, the maturity score could be a 2×1 array (e.g., X, Y coordinate) of the protection score and recovery score. For example, a maturity score could be (73, 43). In this example, the graphing module could plot this computer network onto a graph with protection on the X-axis and recovery on Y axis. (73, 43) would be the plotted point on the graph. Of course, the graph could be plotted as protection on the Y-axis and recovery on the X-axis as well.

Score Weighting

The scoring logic 130 may be configured to determine a frequency in which a particular control appears in category of the CSF. The scoring logic may weight controls that have a higher frequency in the CSF with a higher adjustment factor.

The scoring logic 130 may be configured to determine a length of time since the control was identified as not-implemented (failed) or poorly implemented. In some cases, the scoring logic may comprise a score log configured to store of history of recovery, protection, and/or maturity scores for a computer network. The score log 451 may comprise a score record 451A, each score record may comprise an identifier for the computer network, a first date of security analysis, a first recovery score, first protection score, and a first maturity score. The score record may comprise—2-N(N is a natural number) number of dates, recovery scores, protection scores, and maturity scores. The scoring logic 130 may set a time duration factor that lowers the score of the protection capability and recovery capability when a previously flagged control has not been implemented. In other words, the scoring logic may be configured to decay or decrease a protection score and recovery score based on a function of time, wherein the protection and recovery score decreases as time increase since an initial detection of the non-implemented control.

The scoring logic 130 may comprise a control compliance history analyzer 452 configured to analyze and track control maintenance activity levels 452A of the computer network administrator (system maintainers). The analysis and tracking may be based on (in part) on closures observed over a past time period, and comments from audits of the computer network.

Determine System Detect and Recover

A scoring logic may be configured to determine or take into account that a cybersecurity requirement or category is not relevant to a specific computer network. The scoring logic may be configured to waive the cybersecurity requirement or an entire category when the organization or scoring logic determines that the cyber security requirement or category is not relevant to the computer network's cybersecurity profile. The scoring logic may also waive the cybersecurity requirement or category when the scoring logic receives a time-based waiver or a permanent waiver. Permanent waivers may be provided in cases where the computer network operator can establish that the requirement may be removed through an approved risk acceptance. The scoring logic may label the system maturity score (which may comprise a protection capability and recovery capability) as notional in cases where requirements for the maturity have been waived. The scoring logic may be programmed to generate a raw or actual score that removes any waivers.

In some cases, an operator of the CNA may waive a requirement for a computer network such that a failure to implement a control for that requirement will not affect the computer network's score. The waiver may be temporary or permanent. The administrator or operator of computer network may send a request to the CNA to have the requirement removed through an approved risk acceptance command.

Data Modeling

The computer network analyzer may comprise a data modeler configured to generate a data model. A data model 21 may contain outputs from the computer network analyzer such as output from the cost expenditure analyzer 150, cost savings analyzer 160, control optimization engine 170, recommendation engine 180 such as recommendation report 181, tables generated by the table generator 135, scores generate by the scoring logic 130, responses to queries from the database 200, etc. As described with reference to FIG. 1, the data modeler may comprise cost expenditure analyzer 150, a cost savings analyzer 160, a control optimization engine 170, a recommendation engine 180 as well as other components. With reference to the following tables, the data modeler may also comprise one or more calculators 100 configured to calculate costs and probabilities of modifications to control and/or cybersecurity breaches 100p. For example, the data modeler may comprise a calculator configured to calculate a positive return on investment over a time period for one or more controls identified by the control optimization engine 170.

The data modeler may be configured to use Monte Carlo modeling carried out using published loss and impact distributions informed by the protection and recovery capabilities which define the sampling distribution of the published distributions parameters, which themselves are random distributed. These factors may be combined into a compound distribution which may be sampled through the Monte Carlo simulation to arrive at likelihood and impact of loss for any system under analysis. These projections may be presented to organizational leaders to enable them to understand their risk and take appropriate actions to mitigate, accept, transfer or address. The projections can be made by loss type of breach, disclosure or outage, or can be combine through mathematical means to arrive at a composite loss projection for a system given all loss type over a projection period or return interval.

Figure 5:
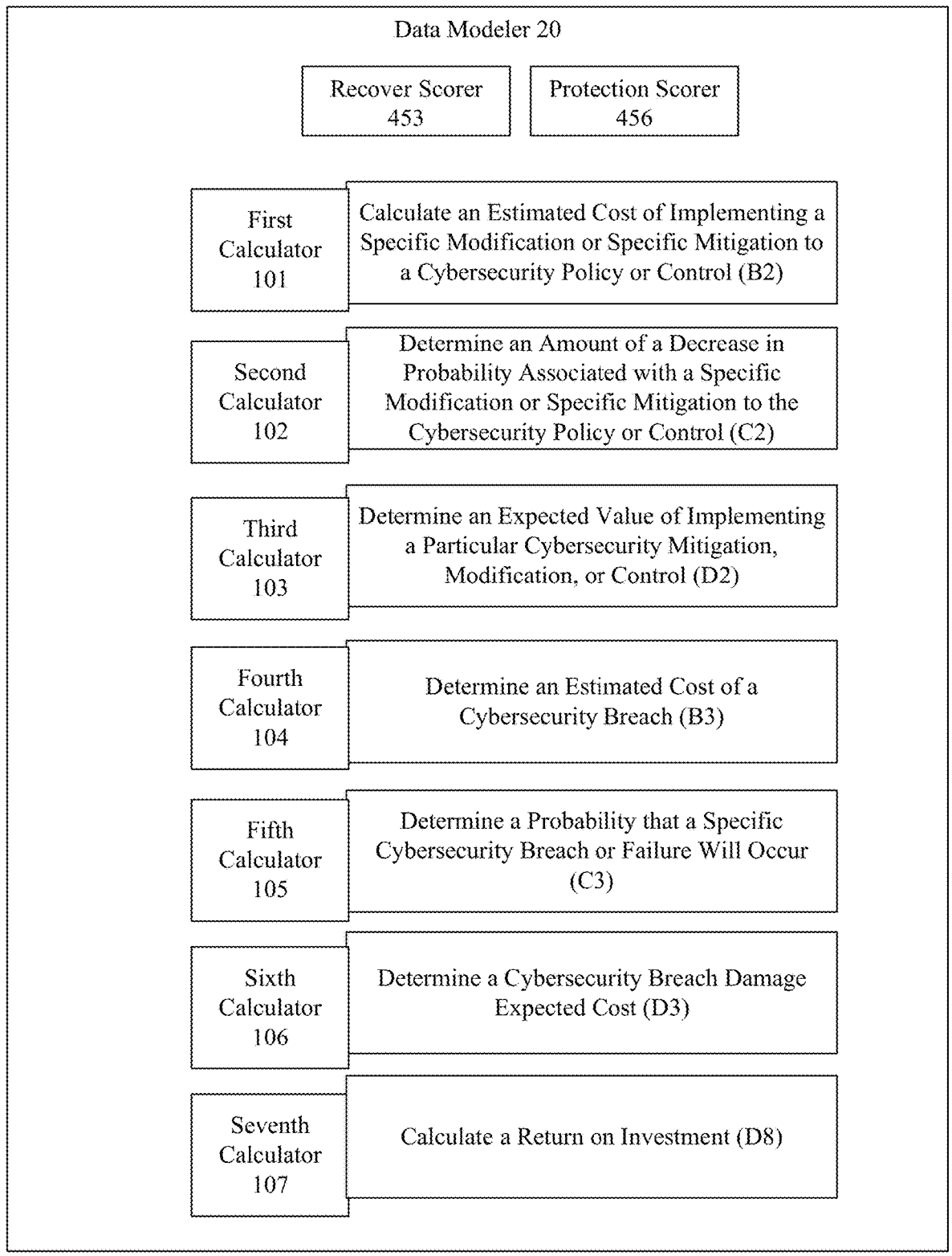
FIG. 5 shows a schematic drawing on a data modeler.

As shown in FIG. 5, the data modeler 20 may comprise a first calculator configured to calculate an estimated cost of implementing a specific modification or specific mitigation to a cybersecurity policy or control (B2). Financial costs may include costs to acquire or repair computer infrastructure, recover from loss of confidentiality, loss of integrity, loss of availability, or labor to repair computer infrastructure, etc. Time costs may include computer network downtime, time to implement repairs, time to acquire computer infrastructure, time to install infrastructure, time computer engineers are not available to work on other projects, etc.

The data modeler may comprise a second calculator configured to determine an amount of a decrease in probability associated with a specific modification or specific mitigation to the cybersecurity policy or control. In other words, the second calculator may determine what the decrease in probability would be when the specific modification or specific mitigation to the cybersecurity policy or control were implemented. (C2). The calculator may express the decrease in value as a fraction or a decimal from 0-1 or as a percentage from 0-100%.

The data modeler may comprise a third calculator configured to determine an expected value of implementing a particular cybersecurity mitigation, modification, or control (D2). The expected value calculated by multiplying the estimated cybersecurity breach damages by the probability that the cybersecurity breach will occur.

The data modeler may comprise a fourth calculator configured to determine an estimated cost of a cybersecurity breach (B3). The estimated cost of a cybersecurity breach may be a financial cost and/or a time cost to implement repair damage associated with a cybersecurity breach. Damage may include financial liabilities, legal liabilities, data loss, unauthorized access, etc.

The data modeler may comprise a fifth calculator configured to determine a probability that a specific cybersecurity breach or failure will occur (C3). A cybersecurity failure could be any event in which data is made available to an unintended party, data cannot be recovered, etc. A cybersecurity breach may include an event such as a data integrity loss, data integrity breach, data loss, unauthorized data disclosure, service loss, service outage, failure to protect data, or failure to recover data. The data modeler may be configured to determine analyze probabilities for all cybersecurity failures. The data modeler may be configured to determine an estimated financial cost associated with the cybersecurity failure such as a financial cost or time cost to replace or restore data, financial liability in terms of lost data, etc.

The data modeler may comprise a sixth calculator configured to determine a cybersecurity breach damage expected cost (D3). The cybersecurity breach damage expected cost being equal to an estimated cybersecurity breach damages times the probability that the cybersecurity breach will occur.

The data modeler 20 may comprise a seventh calculator configured to calculate a return on investment (ROI) (D8) by determining the result of the formula:

ROI=(Cost Without Modifications−Cost with Modifications)/Cost with Modifications.

The seventh calculator may be configured to trend the population by inverting the function of the Rasch model to view the population of functions (instead of systems) to understand the required CSF function's ability to be "difficult to implement" based on its constituent security controls. For example, the seventh calculator may be configured to trend the output of the item response model to view the item difficulties of each cybersecurity function. Also, the calculator may be configured to trend the population to prioritize areas of improvement by viewing the population of functions' difficulties (or likelihood of implementation) to understand where cybersecurity improvements are most necessary. This inversion of the model may yield insights which portray areas for improvement on any arbitrary scale ranging from a single system, to a suite of systems on a single funding source, to an organization's portfolio, departmental component, up to the entire enterprise. Once this measure is taken, follow on investments can be evaluated on an arbitrary time scale to measure their effectiveness while quantitatively measuring the associated return on security investment.

Table 3: ROI Calculator Example 1. Example Showing a 0% ROI

The first table in columns B-D show the values. Columns G and H explain the formulae to compute the values. The second table shows the formulae used to generate the values in the first table.

| A1 | B | C | D | E | F | G | H |
|---|---|---|---|---|---|---|---|
| 2 | $ 500.00 | 0.25 | $ 125.00 | | | B2 | Cost of Modification to Reduce Chance of Breach |
| 3 | $10,000.00 | 0.2 | $2,000.00 | | | C2 | Decrease in Probability a Cybersecurity Breach Will Occur |
| 4 | | | | | | D2 | Expected Value of Modification = (Cost of Modification * Decrease in Probability of Cybersecurity Breach) |
| 5 | | | | | | B3 | Cost of Cybersecurity Breach |
| 6 | | | | | | C3 | Probability of Cybersecurity Breach |
| 7 | | | | | | D3 | Expected Damages of Cybersecurity Breach = Cost of Cybersecurity Breach * Probability of Cybersecurity Breach |
| 8 | $ 2,000.00 | $2,000.00 | 0.00 | % | | B8 | Cost without Modification = Expected Damages of Cybersecurity Breach |
| 9 | | $2,000.00 | | | | C8 | Cost with Modifications = (Cost of Modification + (Decrease in Probability of Breach)(Expected Damages of Cybersecurity Breach) |
| 10 | | | | | | C10 | Cost with Modifications = (Cost of Modification + (Decrease in Probability of Breach)(Expected Damages of Cybersecurity Breach) |
| 11 | | | | | | D8 | Return on Financial Investment in Percent |

| A1 | B | C | D | E |
|---|---|---|---|---|
| 2 | 500 | 0.25 | =B2*C2 | |
| 3 | 10000 | 0.2 | =B3*C3 | |
| 4 | | | | |
| 5 | | | | |
| 6 | | | | |
| 7 | | | | |
| 8 | =D3 | =$B$2 + (1 · $C$2)*($C$3)*($B$3) | =((B8 − C8)/C9)*100 | % |
| 9 | | =$B$2 + (1 − $C$2)*($C$3)*($B$3) | | |
| 10 | | | | |

Table 4: ROI Calculator Example 2. Example Showing a 25% ROI

In Table 4, we reduce the expected cost to implement the modification from $500 to $100. Consequently, it becomes more profitable to implement the modification to the control. In this example, the expected value goes from 0% to 25%.

| A1 | B | C | D | E | F | G | H |
|---|---|---|---|---|---|---|---|
| 2 | $ 100.00 | 0.25 | $ 25.00 | | | B2 | Cost of Modification to Reduce Chance of Breach |
| 3 | $10,000.00 | 0.2 | $2,000.00 | | | C2 | Decrease in Probability a Cybersecurity Breach Will Occur |
| 4 | | | | | | D2 | Expected Value of Modification = (Cost of Modification * Decrease in Probability of Cybersecurity Breach) |
| 5 | | | | | | B3 | Cost of Cybersecurity Breach |
| 6 | | | | | | C3 | Probability of Cybersecurity Breach |
| 7 | | | | | | D3 | Expected Damages of Cybersecurity Breach = Cost of Cybersecurity Breach * Probability of Cybersecurity Breach |
| 8 | $ 2,000.00 | $1,600.00 | 25.00 % | | | B8 | Cost without Modification = Expected Damages of Cybersecurity Breach |
| 9 | | $1,600.00 | | | | C8 | Cost with Modifications = (Cost of Modification + (Decrease in Probability of Breach)(Expected Damages of Cybersecurity Breach) |
| 10 | | | | | | C10 | Cost with Modifications = (Cost of Modification + (Decrease in Probability of Breach)(Expected Damages of Cybersecurity Breach) |
| 11 | | | | | | D8 | Return on Financial Investment in Percent |

Table 5: ROI Calculator Example 3. Example Showing a 5.26% ROI

Continuing the example, Table 5 shows that when we decrease the probability that the modification will prevent the cybersecurity breach from a 25% reduction to just a 10% reduction, we see the ROI decrease from 25% to 5.26%.

| A1 | B | C | D | E | F | G | H |
|---|---|---|---|---|---|---|---|
| 2 | $ 100.00 | 0.1 | $ 10.00 | | | B2 | Cost of Modification to Reduce Chance of Breach |
| 3 | $10,000.00 | 0.2 | $2,000.00 | | | C2 | Decrease in Probability a Cybersecurity Breach Will Occur |
| 4 | | | | | | D2 | Expected Value of Modification = (Cost of Modification * Decrease in Probability of Cybersecurity Breach) |
| 5 | | | | | | B3 | Cost of Cybersecurity Breach |
| 6 | | | | | | C3 | Probability of Cybersecurity Breach |
| 7 | | | | | | D3 | Expected Damages of Cybersecurity Breach = Cost of Cybersecurity Breach * Probability of Cybersecurity Breach |
| 8 | $ 2,000.00 | $1,900.00 | 5.26 % | | | B8 | Cost without Modification = Expected Damages of Cybersecurity Breach |
| 9 | | $1,900.00 | | | | C8 | Cost with Modifications = (Cost of Modification + (Decrease in Probability of Breach)(Expected Damages of Cybersecurity Breach) |
| 10 | | | | | | C10 | Cost with Modifications = (Cost of Modification + (Decrease in Probability of Breach)(Expected Damages of Cybersecurity Breach) |
| 11 | | | | | | D8 | Return on Financial Investment in Percent |

Table 6: ROI Calculator Example 4. Example Showing a −9.09% ROI

Continuing the example, Table 6 shows that when we decrease the expected cost of the cybersecurity breach from $10,000 to just $2,500 the value of the implementing the modification becomes relatively financially sound to perform. Indeed, in this example the data modeler shows a reduction from 5.26% return to negative 9.09% ROI.

| A1 | B | C | D | E | F | G | H |
|---|---|---|---|---|---|---|---|
| 2 | $ 100.00 | 0.1 | $ 10.00 | | | B2 | Cost of Modification to Reduce Chance of Breach |
| 3 | $2,500.00 | 0.2 | $500.00 | | | C2 | Decrease in Probability a Cybersecurity Breach Will Occur |

-continued

| A1 | B | C | D | E | F | G | H |
|---|---|---|---|---|---|---|---|
| 4 | | | | | | D2 | Expected Value of Modification = (Cost of Modification * Decrease in Probability of Cybersecurity Breach) |
| 5 | | | | | | B3 | Cost of Cybersecurity Breach |
| 6 | | | | | | C3 | Probability of Cybersecurity Breach |
| 7 | | | | | | D3 | Expected Damages of Cybersecurity Breach = Cost of Cybersecurity Breach * Probability of Cybersecurity Breach |
| 8 | $500.00 | $550.00 | −9.09 | % | | B8 | Cost without Modification = Expected Damages of Cybersecurity Breach |
| 9 | | $550.00 | | | | C8 | Cost with Modifications = (Cost of Modification + (Decrease in Probability of Breach)(Expected Damages of Cybersecurity Breach) |
| 10 | | | | | | C10 | Cost with Modifications = (Cost of Modification + (Decrease in Probability of Breach)(Expected Damages of Cybersecurity Breach) |
| 11 | | | | | | D8 | Return on Financial Investment in Percent |

The data modeler may be configured to determine modification costs (B2) and decrease in probabilities of occurrence (C2) for a variety of possible modifications to the computer network controls for a given cybersecurity breach. Each modification to the computer network control may have an associated cost. Each modification to the computer network control may have an associated change in the probability that a cybersecurity failure will occur. The cost of the modification and the change in the probability of a failure between two or more modifications might not be the same.

The data modeler may comprise a recommendation engine 180 configured to analyze a plurality of modifications for potential cybersecurity breach. The recommendation engine may generate a recommendation comprising a highest return on investment. The data modeler may be configured to analyze a plurality of modifications for a potential cybersecurity breach and generate a recommendation comprising a lowest risk of cybersecurity breach.

The recommendation engine may be configured to analyze a plurality of modifications for a plurality of cybersecurity breaches. The recommendation engine may be configured to select cybersecurity breaches that have a recommended modification over a predetermined value for the return on investment. E.g., the recommendation engine could be configured to identify all modifications that have a 25% or higher ROI when implemented. Additionally, the recommendation engine could be configured to accept a specific budget for repairs (e.g., $6,000). The recommendation engine could use that budget to identify the modifications and cybersecurity breaches that yield the highest return on investment given that budget. In essence, the recommendation engine could be configured to optimize a budget for an operator of computer network.

The data modeler may be configured to model a plurality of cybersecurity breaches and determine a plurality of possible control implementation changes. The data modeler may comprise a control recommendation engine configured to identify a plurality of control changes that would cause scoring logic to increase the ML rank of the computer network by a set amount. The set amount may be an integer or single rank increase. The data modeler may be configured to identify a plurality of control implementation changes that maximize return on investment. Return on investment may be calculated using the formula ROI=(Costs associated with not performing the change to controls+Costs to perform the control changes)/(Costs to perform the control changes)× 100. Costs associated with not performing the control changes may be costs associated with a cybersecurity breach. The costs may be calculated as a direct value or as expected value (which accounts for the probability the cost will be realized.) The data modeler may be configured to generate a return on investment over a specific amount of time such as six months, one year, five years, etc. The amount of time may be predetermined or may be user adjustable.

Figure 6:
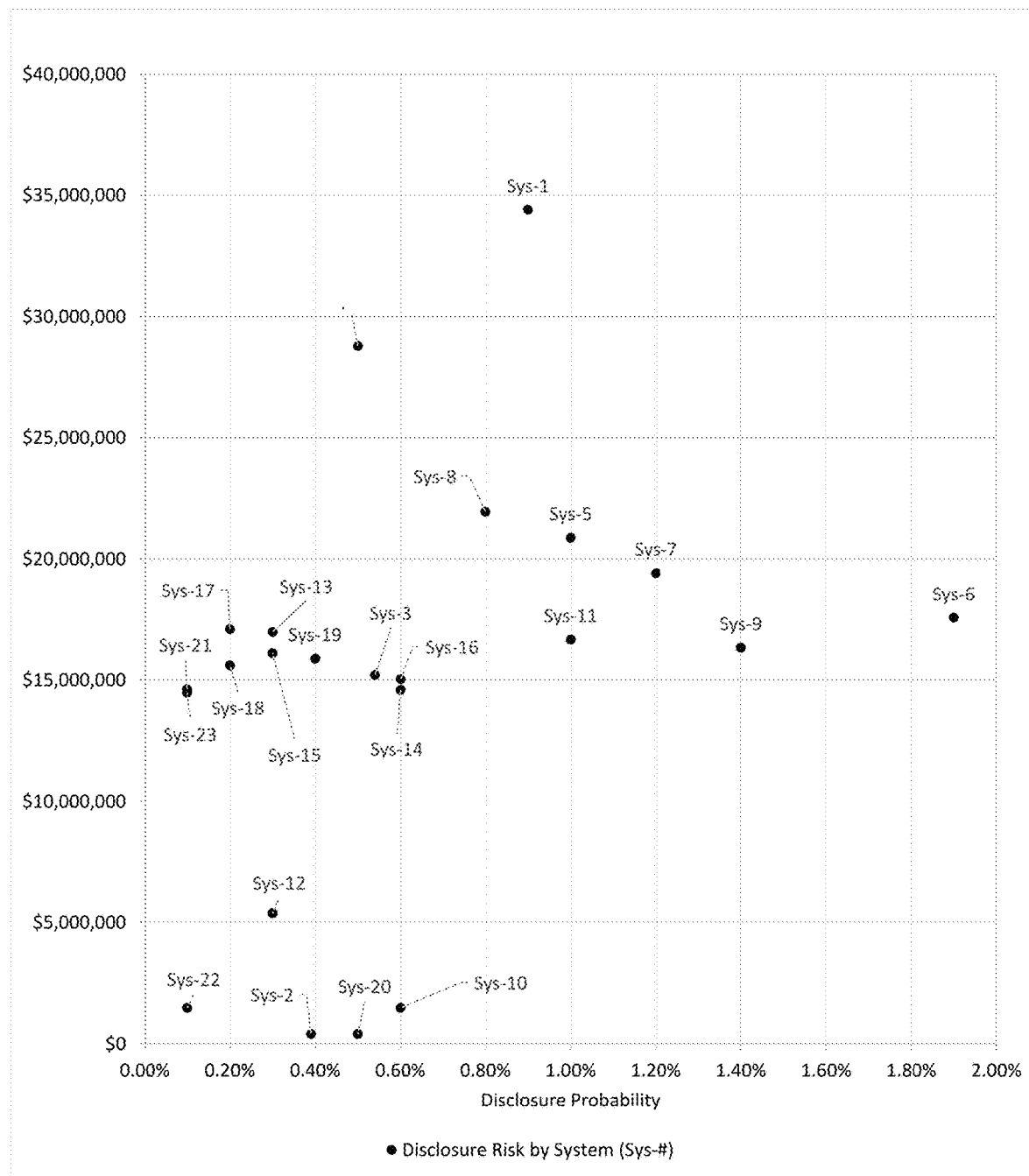
FIG. 6 shows a graph of disclosure risk by system.

FIG. 6 shows a chart of disclosure probability for a system (sys) (x-axis) plotted against 90th percentage cost for a single disclosure. In other words, the graphing module 140 may be configured to generate a graph or chart of disclosure probability for a system and cost for an event disclosure. For example, the graph in FIG. 6 shows a 90th percentage cost (e.g., a high estimate of maximal cost) for a single event disclosure. The graphing module may be configured to show other percentages such as 25%, 50%, or multiple overlayed percentages. The table generator 135 may be configured to generate a table such as Table 7. The graphing module may be configured to build graph shown in FIG. 6 by analyzing data from Table 7 (e.g., acquire source data for the graph.)

TABLE 7

Disclosure Risk by System

| Disclosure Risk by System (Sys-#) | Disclosure Probability | 90th Percentile Cost |
|---|---|---|
| Sys-1 | 0.90% | $34,414,576 |
| Sys-2 | 0.39% | $409,909 |
| Sys-3 | 0.54% | $15,212,307 |
| Sys-4 | 0.50% | $28,775,608 |
| Sys-5 | 1.00% | $20,885,466 |
| Sys-6 | 1.90% | $17,573,781 |
| Sys-7 | 1.20% | $19,421,751 |
| Sys-8 | 0.80% | $21,957,026 |
| Sys-9 | 1.40% | $16,334,279 |
| Sys-10 | 0.60% | $1,485,759 |
| Sys-11 | 1.00% | $16,670,696 |
| Sys-12 | 0.30% | $5,379,055 |
| Sys-13 | 0.30% | $16,985,870 |
| Sys-14 | 0.60% | $14,594,960 |
| Sys-15 | 0.30% | $16,106,842 |
| Sys-16 | 0.60% | $15,036,148 |
| Sys-17 | 0.20% | $17,097,240 |
| Sys-18 | 0.20% | $15,607,841 |
| Sys-19 | 0.40% | $15,876,403 |
| Sys-20 | 0.50% | $407,809 |
| Sys-21 | 0.10% | $14,622,788 |

TABLE 7-continued

Disclosure Risk by System

| Disclosure Risk by System (Sys-#) | Disclosure Probability | 90th Percentile Cost |
|---|---|---|
| Sys-22 | 0.10% | $1,485,759 |
| Sys-23 | 0.10% | $14,479,655 |

Hardware Configurations

The CNA and/or data modeler may include a hardware processor communicatively coupled to an instruction memory and to a data memory by a bus. The instruction memory can be configured to store, on at least a non-transitory computer readable medium as described in greater detail below, executable program code. The hardware processor may include multiple hardware processors and/or multiple processor cores. The hardware processor may include cooperation with hardware processors from different devices. The server, hub, and endpoint may execute one or more basic instructions included in the executable program code. The server, hub, and endpoint can include a network interface communicatively connected to the bus, for interfacing to a wide area network (WAN), e.g., the Internet or a private area network. Also communicatively connected to the bus can be a GUI. The CNA and/or data modeler may also include a mass storage, which can be accessible to the hardware processor via the bus.

The relationship between the executable program code and the hardware processor is structural; the executable program code is provided to the hardware processor by imparting various voltages at certain times across certain electrical connections, in accordance with binary values in the executable program code, to cause the hardware processor to perform some action, as now explained in more detail.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. The hardware processor interprets the voltages as binary values.

Executable program code may therefore be understood to be a set of machine codes selected from the predefined native instruction set of codes. A given set of machine codes may be understood, generally, to constitute a module. A set of one or more modules may be understood to constitute an application program. An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be stored in a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term means;" the terms "logic" and "module" have the meaning ascribed to them above and are not to be construed as generic means. An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it will be understood that the subject matter defined in the appended claims is not necessarily limited to the specific features or steps described. Rather, the specific features and steps are disclosed as example forms of implementing the claimed subject matter. To the extent headings appear in this description, they are for the convenience of the reader, not as limitations or restrictions of the systems, techniques, approaches, methods, or devices to those appearing in any section. Rather, the teachings and disclosures herein can be combined or rearranged with other portions of this disclosure and the knowledge of one of ordinary skill in the art.

This disclosure generally encompasses and includes such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application-specific integrated circuit, or that may cause a computer (e.g., a general-purpose computer) executing the instructions to have defined characteristics. There may be a combination of hardware and software such as processor implementing firmware, software, and so forth, to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, structures for a module a module can be according to the module's function or set of functions, e.g., in accordance with a described algorithm. This disclosure may use nomenclature that associates a component or module with a function, purpose, step, or sub-step to identify the corresponding structure which, in instances, includes hardware and/or software that function for a specific purpose.

Titles and heading used throughout the specification are provided for navigational purposes only. They should not be considered as limiting or defining of the subject matter disclosed. Paragraphs and sections relevant to one figure or embodiment may be equally relevant to another figure.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

The claimed invention is:

1. A computer network analyzer (CNA) having a cybersecurity policy comprising:
   a network information gatherer configured to gather information about a computer network having hardware and software;
   a network response analyzer configured to assess implementation quality of security functions within a cybersecurity policy including a protection capability and a recovery capability;
   a scoring logic configured to score the implementation quality of the security functions;
   a graphing module configured to graphically display a generated score from the scoring logic;
   a data modeler configured to model costs, savings, and probabilities associated with implementing or not implementing a change to a computer network control or the cybersecurity policy;
   a control optimization engine configured to identify one or more computer network controls to improve the score to generate a positive expected return on investment in a preset time period;
the control optimization engine configured to select a modification to the one or more computer network controls that, when implemented, will raise the score of the computer network's cybersecurity policy as calculated by the scoring logic; and
a feedback loop configured to implement the modification to the computer network control to the computer network.

2. The computer network analyzer (CNA) of claim 1 comprising:
a table generator configured to generate a database comprising:
at least 20 subcategory IDs;
a subcategory score for each subcategory ID;
a subcategory weighting for each subcategory ID;
a capability allocator for associating the subcategory ID either with protection capability or the recovery capability, but not both;
a subcategory calculator configured to determine a total subcategory ID score;
a function calculator configured to determine a total function score;
a capability calculator configured to use the capability allocation, total subcategory ID score, and total function score to generate a total protection score and a total recovery score;
a maximum score calculator configured to determine a maximum protection score and a maximum recovery score;
a maturity score calculator configured to determine a maturity score containing a 2×1 array; and
a graphing module configured to generate a graph comprising the maturity score.

3. The computer network analyzer (CNA) of claim 2 comprising a maturity score calculator configured to:
determine a first element in the 2×1 array by dividing the total protection score by the maximum protection score; and
determine a second element in the 2×1 array by dividing the total recovery score by the maximum recovery score.

4. The computer network analyzer (CNA) of claim 3 wherein the 2×1 array is a coordinate and the first element is an X coordinate and the second element is a Y coordinate.

5. The computer network analyzer (CNA) of claim 3 wherein the scoring logic is configured to implement item response theory modeling to generate the maturity score.

6. The computer network analyzer (CNA) of claim 5 comprising:
a cost expenditure analyzer configured to determine an expected cost expenditure analysis for implementing a control improvement; and
a cost savings analyzer configured to determine an expected cost savings analysis for implementing the improvement.

7. The computer network analyzer (CNA) of claim 6 comprising a recommendation engine configured to utilize the expected cost expenditure analysis, the cost savings analysis, and identified control modifications to recommend a change to the computer network control to a computer network's cybersecurity policy that will improve the maturity score of the computer network.

8. The computer network analyzer (CNA) of claim 1 comprising a graphing module configured to generate a graph comprising:

a first curved line having the formula $R=f^1(P)$;
a second curved line having the formula $R=f^2(P)$;
a third curved line having the formula $R=f^3(P)$; and
a fourth curved line having the formula $R=f^4(P)$.

9. The computer network analyzer (CNA) of claim 8 wherein the graphing module is configured to:
set a first maturity rank to ML1, if the maturity score has a coordinate value that is less than or equal to all coordinate values on the first curved line;
set a second maturity rank to ML2, if the maturity score has a coordinate value that is greater than any value on the first curved line, but less than all coordinates values on the second curved line;
set a third maturity rank to ML3, if the maturity score has a coordinate value that is greater than any value on the second curved line, but less than all coordinates values on the third curved line;
set a fourth maturity rank to ML4, if the maturity score has a coordinate value that is greater than any value on the third curved line, but less than all coordinates values on the fourth curved line; and
set a fifth maturity rank to ML5, if the maturity score has a coordinate value that is greater than any value on the fourth curved line, but less than all coordinates values on the fourth curved line.

10. The computer network analyzer (CNA) of claim 1 comprising a graphing module configured to generate a graph comprising first maturity score, a second maturity score, and a third maturity score; wherein the first maturity score, second maturity score, and third maturity score corresponds to protectionability and recoverability a computer network.

11. The computer network analyzer (CNA) of claim 10 wherein:
the first maturity score, second maturity score, and third maturity score have different coordinate values, but all have a maturity level of 1; and
the first maturity score, second maturity score, and third maturity score having a coordinate value that is less than or equal to all coordinate values on a first curved line.

12. The computer network analyzer (CNA) of claim 10 wherein:
the first maturity score, second maturity score, and third maturity have different coordinate values, but all have a maturity level of 2;
the first maturity score, second maturity score, and third maturity score having a coordinate value that is greater than or equal to all coordinate values on a first curved line; and
the first maturity score, second maturity score, and third maturity score having a coordinate value that is less than or equal to all coordinate values on a second curved line.

13. The computer network analyzer (CNA) of claim 1 wherein the data modeler comprises a calculator configured to calculate a positive return on investment over a time period for the one or more identified computer network controls.

14. The computer network analyzer (CNA) of claim 1 wherein the network information gatherer comprises a question generator and an answer generator.

15. The computer network analyzer (CNA) of claim 1 comprising:
a computer network survey system configured to send to the computer network:

a first question about a first control; the first question comprising a first answer set and a first correct answer;

a second question about a second control; the second question comprising a second answer set and a second correct answer;

a third question about a third control; the third question comprising a third answer set and a third correct answer; and a data gatherer configured to receive answers to the first question, second question, and third question.

16. The computer network analyzer of claim 15 comprising an answer integrity analyzer configured to determine whether the first correct answer, second correct answer, and third correct answer supplied to the CNA from the computer network are trustworthy or untrustworthy.

17. The computer network analyzer of claim 15 comprising a question-difficulty classifier configured to assign a difficulty score associated with challenges associated with implementing the first control, second control, and third control.

18. The computer network analyzer (CNA) of claim 17 wherein the question-difficulty classifier is configured to assign the difficulty score of easy, medium, or hard to the first question, second question, and third question.

19. The computer network analyzer (CNA) of claim 17 wherein the difficulty score depends on:
   costs for the computer network to implement the control;
   customizations of hardware in the computer network to implement the control; and
   employment or contracting of personnel with specialized knowledge to deploy the control; wherein specialized knowledge means the personnel has a graduate degree in a computer-related field.

20. The computer network analyzer (CNA) of claim 17 wherein the question-difficulty classifier is configured to assign the difficulty score of easy, medium, or hard; wherein a hard difficulty score requires more modifications to the hardware and the software of the computer network than a medium difficulty control; and a medium difficulty score requires more modifications to the hardware and the software of the computer network than an easy difficulty control.

21. The computer network analyzer (CNA) of claim 17 comprising an answer integrity analyzer configured to determine the answers received by the data gatherer are trustworthy when:
   the data gatherer receives more incorrect answers for hard questions than incorrect answers for medium questions; and the data gatherer receives more incorrect answers for medium questions than incorrect answers for easy questions; or
   the data gatherer receives more correct answers for medium questions than correct answers for hard questions; and the data gatherer receives more correct answers for easy questions than incorrect answers for medium questions.

22. The computer network analyzer (CNA) of claim 17 comprising an answer integrity analyzer configured to determine the answers received by the data gatherer are untrustworthy when:
   the data gatherer receives less incorrect answers for hard questions than incorrect answers for medium questions; and the data gatherer receives less incorrect answers for medium questions than incorrect answers for easy questions; or
   the data gatherer receives less correct answers for medium questions than correct answers for hard questions; and the data gatherer receives less correct answers for easy questions than incorrect answers for medium questions.

23. The computer network analyzer (CNA) of claim 17 comprising an answer integrity analyzer configured to determine the answers in the answer set are trustworthy when the answers indicate that more easy difficulty controls are implemented than medium difficulty controls and more medium difficulty controls are implemented than hard difficulty controls.

24. The computer network analyzer (CNA) of claim 17 comprising an answer integrity analyzer configured to determine the answers in the answer set are untrustworthy when the answers indicate that less easy difficulty controls are implemented than medium difficulty controls and less medium difficulty controls are implemented than hard difficulty controls.

25. The computer network analyzer (CNA) of claim 17 comprising an answer integrity analyzer configured to:
   determine that the answers to the questions indicate that the computer network has implemented at least a first minimum number of easy difficulty controls as compared to medium difficulty controls; wherein the first minimum number is at least X; or
   determine that the answers to the questions indicate that the computer network has implemented at least a second minimum number of medium difficulty controls as compared to hard difficulty controls; wherein the second minimum number is at least Y; and
   set a level of trustworthiness to the answers as trustworthy; where in X and Y are natural numbers.

26. The computer network analyzer (CNA) of claim 17 comprising an answer integrity analyzer configured to:
   determine that the answers to the questions indicate that the computer network has implemented less than a minimum number of easy difficulty controls as compared to medium controls; wherein the minimum number is at least X; or
   determine that the answers to the questions indicate that the computer network has implemented less than a minimum number of additional medium difficulty controls as compared to hard difficulty controls; wherein the minimum number is at least Y; and
   set a level of trustworthiness to the answers as untrustworthy; where in X and Y are natural numbers.

27. The computer network analyzer (CNA) of claim 17 comprising an answer integrity analyzer configured to:
   determine that the answers to the questions indicate that the computer network has implemented more hard difficulty controls than medium difficulty controls; or
   determine that the answers to the questions indicate that the computer network has implemented more medium difficulty controls than easy difficulty controls; and
   set a level of trustworthiness to the answers as untrustworthy.

28. A method for improving controls in a computer network cybersecurity policy comprising:
   gathering information about a computer network with a network information gatherer;
   assessing implementation quality of security functions within the cybersecurity policy with a network response analyzer;
   scoring the implementation quality of the security functions with a scoring logic;
   graphically displaying a generated score from the scoring logic with a graphing module;

determining an expected cost expenditure analysis for implementing a control improvement with a cost expenditure analyzer;

determining an expected cost savings analysis for implementing the improvement with a cost savings analyzer;

identifying one or more computer network controls to improve with a control optimization engine; the control optimization engine selecting a modification to the one or more computer network controls that, when implemented, will raise the score of the computer network's cybersecurity policy as calculated by scoring logic;

utilizing the expected cost expenditure analysis, the cost savings analysis, and identified control modifications to recommend a change to a control to a computer network's cybersecurity framework that will improve a maturity score of the computer network with a recommendation engine; and implementing the change to the control to the computer network with a feedback loop.

* * * * *